(12) United States Patent
Vissing et al.

(10) Patent No.: US 8,455,104 B2
(45) Date of Patent: Jun. 4, 2013

(54) FLEXIBLE PLASMA POLYMER PRODUCTS, CORRESPONDING ITEMS AND USE THEREOF

(75) Inventors: Klaus-Dieter Vissing, Morsum (DE); Gabriele Neese, Bremen (DE); Matthias Ott, Dohren (DE)

(73) Assignee: Fraunhofer-Gesellschaft zur Forderung der Angewandten Forschung e.V., Munich (DE)

( * ) Notice: Subject to any disclaimer, the term of this patent is extended or adjusted under 35 U.S.C. 154(b) by 747 days.

(21) Appl. No.: 12/297,750

(22) PCT Filed: Apr. 19, 2007

(86) PCT No.: PCT/EP2007/053859
§ 371 (c)(1),
(2), (4) Date: Jan. 13, 2009

(87) PCT Pub. No.: WO2007/118905
PCT Pub. Date: Oct. 25, 2007

(65) Prior Publication Data
US 2009/0197078 A1    Aug. 6, 2009

(30) Foreign Application Priority Data

Apr. 19, 2006  (DE) .......................... 10 2006 018 491

(51) Int. Cl.
*B32B 9/04* (2006.01)
*C23C 4/04* (2006.01)

(52) U.S. Cl.
USPC ............ 428/447; 428/446; 427/452; 427/489

(58) Field of Classification Search
USPC .......................... 428/447, 446; 427/452, 489
See application file for complete search history.

(56) References Cited

U.S. PATENT DOCUMENTS

| | | | |
|---|---|---|---|
| 5,576,068 A | | 11/1996 | Caburet et al. |
| 5,641,559 A | * | 6/1997 | Namiki .......................... 428/216 |
| 7,157,145 B2 | * | 1/2007 | Vissing et al. ................ 428/447 |

FOREIGN PATENT DOCUMENTS

| | | |
|---|---|---|
| JP | T-08-509421 | 7/1995 |
| JP | T-11-511769 | 11/1996 |
| WO | WO95/19837 | 7/1995 |
| WO | WO99/04911 | 2/1999 |
| WO | WO03/002269 | 1/2003 |
| WO | WO2005/110626 | 11/2005 |

\* cited by examiner

*Primary Examiner* — Hannah Pak
(74) *Attorney, Agent, or Firm* — Preti Flaherty Beliveau & Pachios LLP

(57) ABSTRACT

The present invention concerns items that contain or consist of a plasma polymer product, consisting of carbon, silicon, oxygen and hydrogen, wherein the ESCA spectrum of the plasma polymer product, with calibration to the aliphatic portion of the C 1s peak at 285.00 eV, in comparison with a trimethylsiloxy-terminated polydimethylsiloxane (PDMS) with a kinematic viscosity of 350 mm$^2$/s at 25° C. and a density of 0.97 g/ml at 25° C., the Si 2p peak has a bond energy that is shifted by 0.44 eV, at most, to higher or lower bond energies, and the O 1s peak has a bond energy that is shifted by 0.50 eV, at most, to higher or lower bond energies.

6 Claims, 22 Drawing Sheets

FLEXIBLE PLASMA POLYMER PRODUCTS, CORRESPONDING ITEMS AND USE THEREOF

Figure 1:
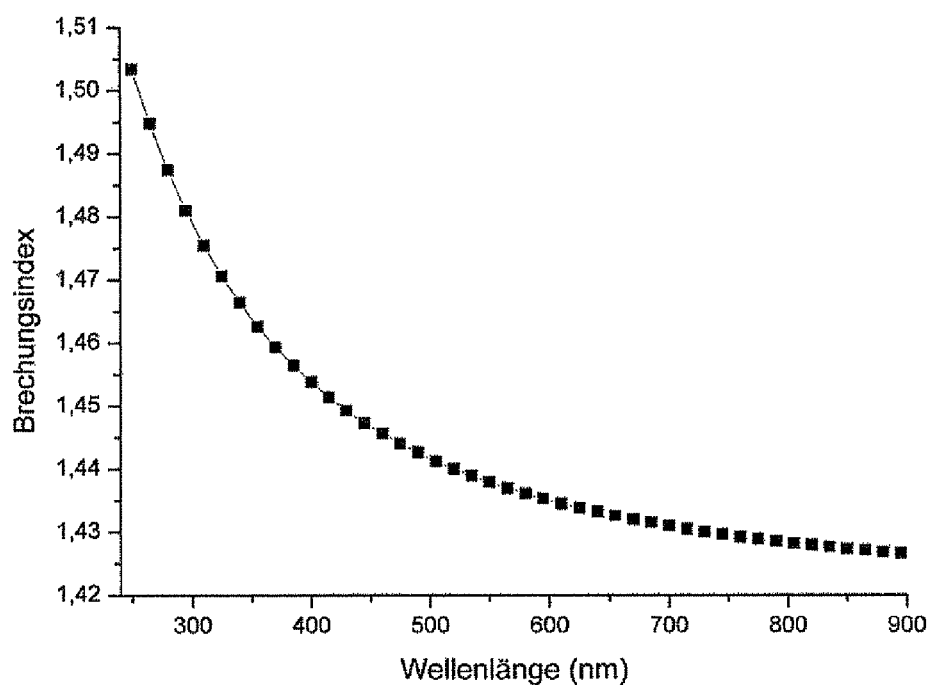
Figure 2:
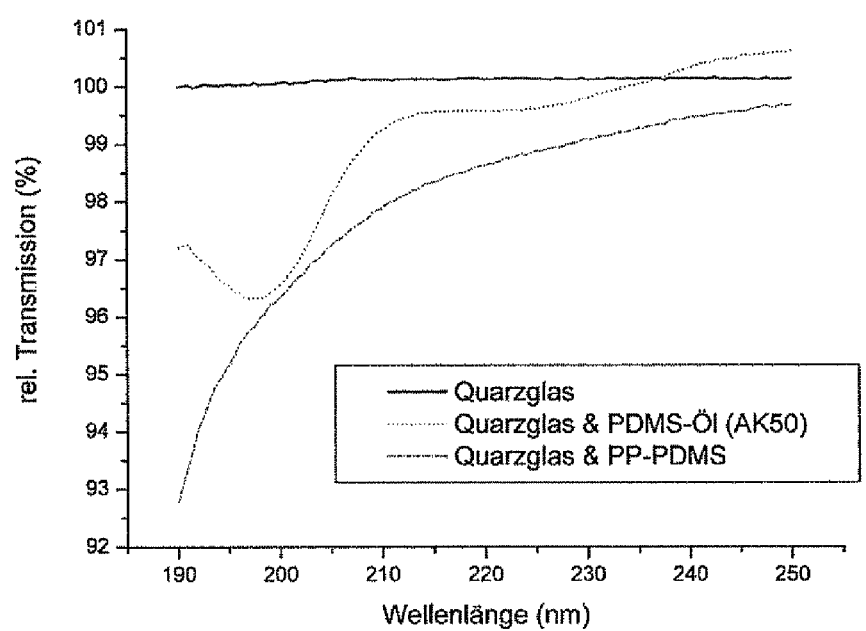
Figure 3:
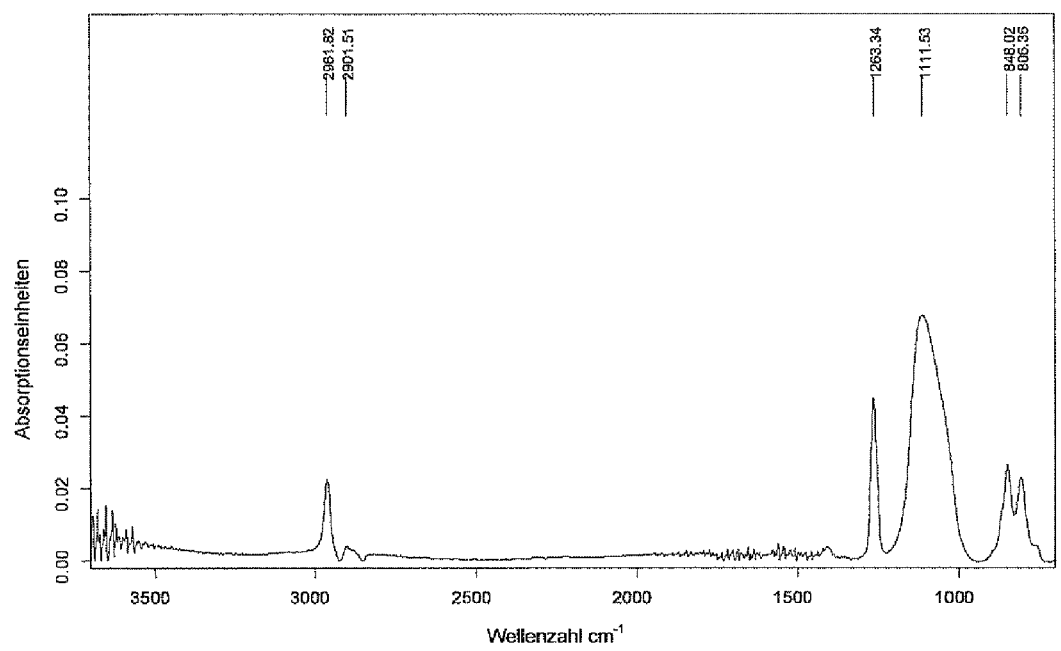
Figure 4:
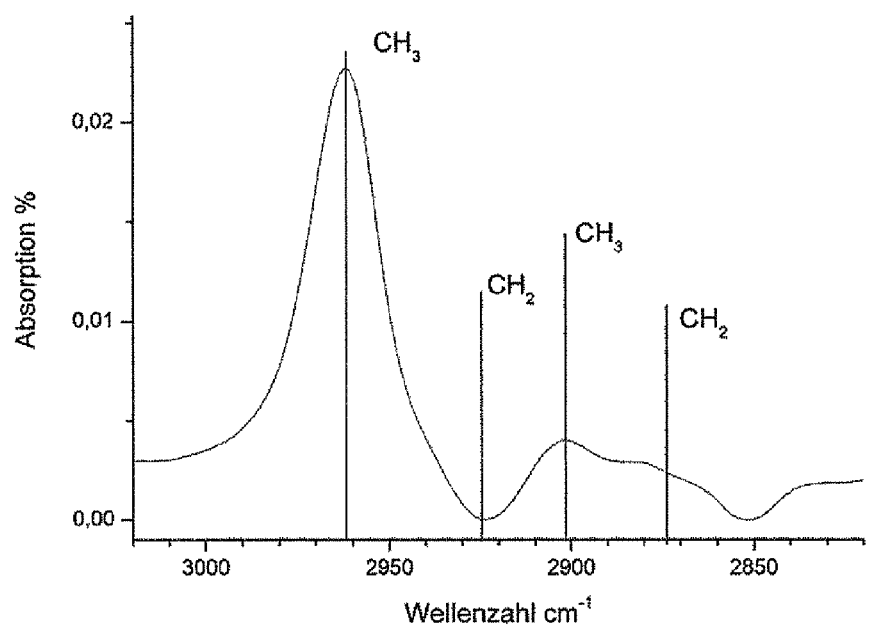
Figure 5:
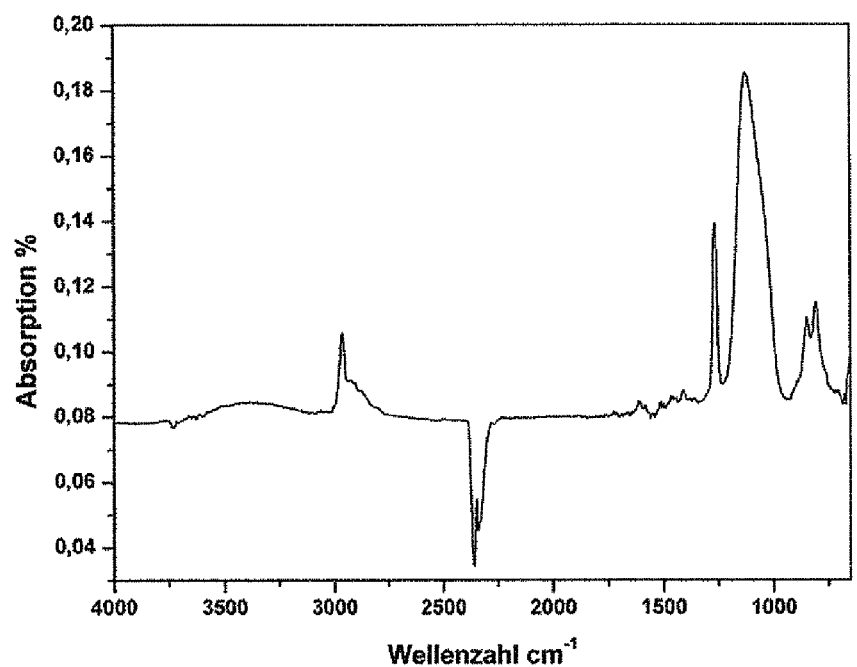
Figure 6:
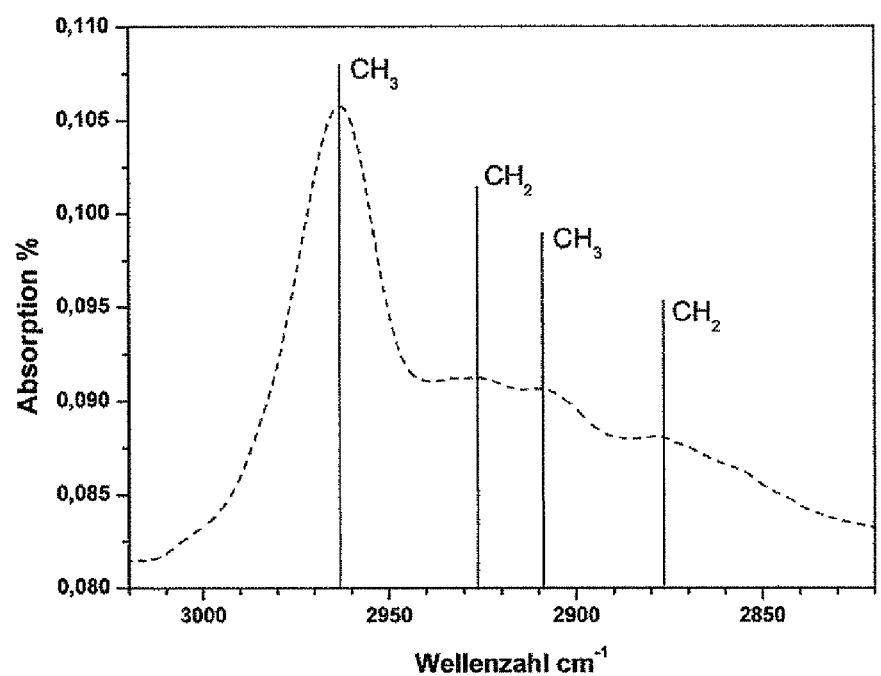

This application is a §371 national phase filing of PCT/EP2007/053859, filed Apr. 19, 2007, and claims priority to German Application No. 10 2006 018 491.2, filed Apr. 19, 2006.

The present invention concerns items that consist of a plasma polymer product or contain such a plasma polymer product; the invention also concerns the use of corresponding (inventive) plasma polymer products, a method of manufacturing corresponding plasma polymer products and plasma polymer products that can be manufactured using an inventive method.

The inventive plasma polymer products (as inventive items or components thereof) comprise carbon, silicon, oxygen and hydrogen and possible normal impurities.

A "plasma polymer product" here is a product which can be manufactured by plasma polymerisation. Plasma polymerisation is a method by which gaseous precursors (frequently also referred to as monomers), excited by a plasma, condense onto a freely selectable substrate as a highly cross-linked coating. A condition for plasma polymerisation is the presence of cross-linking atoms such as carbon and silicon in the working gas. By virtue of the excitation the molecules of the gaseous substance, through bombardment with electrons and/or energy-rich ions, are fragmented. The result is highly excited radical or ionic molecular fragments, which react with each other in the gas space and are deposited onto the surface to be coated. The electrical discharge of the plasma and its intensive ion and electron bombardment acts constantly upon this deposited coating, so that in the deposited coating further reactions are triggered and a high degree of cross-linkage of the deposited molecules can be achieved.

In the context of the present document the term "plasma polymer product" also covers products which are or have been manufactured by means of plasma-enhanced CVD (PE-CVD). Here in order to the carry out the reaction the substrate is also heated. In this way, for example, hydrosilicon and oxygen can be used to manufacture $SiO_2$ coatings. Furthermore, express mention is made of the fact that atmospheric pressure plasma methods can also be used for manufacturing the inventive product, although low pressure plasma polymerisation methods are currently preferred.

Items with a plasma polymer coating have been known about for a long time. Particular reference can be made at this point to document DE 101 31 156 A1 (Fraunhofer-Gesellschaft), which concerns an item with a plasma polymer coating that is particularly easy to clean (easy-to-clean coating).

Further documents from the state of the art are: U.S. Pat. No. 5,230,929 A; WO 99/22878; EP9 609 58A2; DE10056564A1; EP1 123991A2; EP1 260 606A2; DE100 47 124 A1 and the documents also quoted in DE 101 31156 A1.

The plasma polymer coatings in accordance with DE 101 31 156 A1 are eminently suitable as easy-to-clean coatings. Like the other plasma polymer coatings known from the state of the art, however, they have only low elasticity and flexibility. Under mechanical loading (in particular bending or extension), therefore, undesirable cracks appear in the plasma polymer coating, which have an overall adverse effect on the mechanical properties and in particular performance characteristics of the plasma polymer coatings.

The problem for the invention was therefore to indicate an item, containing or consisting of a plasma polymer, three-dimensional cross-linked product, whereby the plasma polymer product has a particularly high flexibility and elastic extensibility compared with the previously known plasma polymer products, comprising carbon, silicon, oxygen and hydrogen. In so doing the formation of so-called oligomer products (coatings that have a viscous, oily character), as often described in the literature, should be avoided, in order to achieve fitness for intended purpose and to guarantee a suitable connection to surfaces, in particular plasma polymer surfaces.

Here the plasma polymer coatings to be indicated should preferably also be usable in the same fields of application as the plasma polymer coatings known to date, thus, for example, as a scratch-resistant coating, as a non-stick, dirt-repellent coating or as a barrier coating.

The problem posed is solved in accordance with the invention by an item that contains or consists of a plasma polymer product, consisting of carbon, silicon, oxygen and hydrogen, and possible normal impurities, whereby in the ESCA spectrum (ESCA—Electron Spectroscopy for Chemical Analysis, often also referred to as XPS investigation, XPS=X-ray Photoelectron Spectroscopy) of the plasma polymer product, with calibration to the aliphatic portion of the C 1 s peak at 285.00 eV, in comparison with a trimethylsiloxy-terminated polydimethylsiloxane (PDMS) with a kinematic viscosity of 350 mm2/s at 25° C. and a density of 0.97 g/ml at 25° C., the Si 2p peak has a bond energy that is shifted by 0.44 eV (preferably a maximum of 0.40 eV, with particular preference for 0.30 eV) to higher or lower bond energies, and thus for example at an Si 2p peak of the PDMS of 102.69 has a bond energy that is in the range 102.23 to 103.13 eV and the O 1s peak has a bond energy that is shifted by 0.50 eV at most (preferably a maximum of 0.40 eV, with particular preference for 0.30) to higher or lower bond energies (preferably to higher bond energies), and so for example at an O 1 s peak of the PDMS of 532.46 eV has a bond energy that is in the range 531.96 to 532.96 eV.

One trimethylsiloxy-terminated polydimethylsiloxane (PDMS) with a kinematic viscosity of 350 $mm^2/s$ at 25° C. and a density of 0.970 g/ml at 25° C. is the product DMS-T23E from Gelest.

Here the calibration of the measuring device—as mentioned—, carried out in such a way that the aliphatic portion of the C 1 peak is at 285.00 eV. Because of charging effects as a rule it is necessary to shift the energy axis to this fixed value without further modification.

For a further preferred method in accordance with the invention for performing the ESCA investigation see Example 4 below.

Plasma polymer products (as an inventive item or a component of such an item) with the stated values for the bond energy positions are characterised by a high proportion of silicon atoms, which are cross-linked with precisely two oxygen atoms. At the same time the proportion of silicon atoms which are cross-linked with three or four oxygen atoms is particularly low. The particularly high proportion of silicon atoms with two contiguous oxygen atoms ("secondary silicon") compared with silicon atoms with three or four contiguous oxygen atoms ("tertiary" or "quaternary" silicon) means that there is a low proportion of three-dimensional cross-linking in the inventive plasma polymer product (as such or as a component of an inventive item) compared with conventional plasma polymer products, but this is nevertheless still present. At the same time, the proportion of linear chain (sections) is high. The is probably the reason for the increased elasticity and flexibility of the inventive plasma polymer products.

An inventive plasma polymer product (as an inventive item or a component of such an item) generally has the following characteristics:

Specific thermal conductivity: approx. 0.2 W/° K m
Linear coefficient of thermal expansion in the range 0-150° C.: approx. $2.5 \times 10^{-4}$ m/mK
Refractive index at 25° C.: approx. 1.5 at 250 nm to 1.425 at 895 nm
Dynamic contact angle: (measured by increasing droplets on Si-wafers at 23° C. on air)
approx. 102° for water
approx. 86° for diiodomethane
approx. 80.5° for ethylene glycol
Specific heat capacity: approx. 1.55 J/g K
Dielectric strength: approx. 23 kV/mm
Volume resistivity: $>10^{14}$ Ωcm at 23° C.
Dielectric constant: approx. $3 \in_r$ at 23° C., 50 Hz
Dielectric loss factor: approx. $50 \times 10^{-4}$ tan δ
Density: 0.9 to 1.15 g/cm$^3$ Both the spectroscopic data (in particular the bond energy positions according to the ESCA analysis and the detailed evaluation of FTIR spectra—the comparison of the FTIR spectra shows for the inventive product a lower proportion of $CH_2$—vibration bands than easy-to-clean coatings) and the mechanical characteristics of the inventive plasma polymer products (as an inventive item or a component of such an item) differ distinctly from those of the coatings in accordance with DE 101 31 156 A1. For the ESCA data see also the tabular summary (Table 1) below.

The bond energy positions of a quite particularly preferred inventive plasma polymer product are shown in tabular form below (see Table 1).

The bond energy positions (or shifts) for the inventive plasma polymer product are related to the substance quantity ratios and the proportions of the elements present in the plasma polymer Product.

Generally for the substance quantity ratios in the inventive plasma polymer product (as an inventive item or a component of such an item) the following applies:
$0.75 < n(O):n(Si) < 1.25$
$1.50 < n(C):n(Si) < 2.50$
$1.50 < n(C):n(O) < 2.50$
$2.25 < n(H):n(C) < 3.00$.

Preferably for the substance quantity ratios in the plasma polymer product, however, the following applies:
$1.00 < n(O):n(Si) < 1.25$
$2.00 < n(C):n(Si) < 2.50$
$1.60 < n(C):n(O) < 2.30$
$2.40 < n(H):n(C) < 3.00$.

Quite particularly for the substance quantity ratios in the plasma polymer product the following applies:
$1.05 < n(O):n(Si) < 1.23$
$2.10 < n(C):n(Si) < 2.23$
$1.70 < n(C):n(O) < 2.00$
$2.60 < n(H):n(C) < 3.00$.

Here the substance quantity ratios of all atoms pairs excluding hydrogen relate to the ESCA measurements at settings, which for a trimethylsiloxy-terminated polydimethylsiloxane (PDMS) again used as a standard with a kinematic viscosity of 350 mm$^2$/s at 25° C. and a density of 0.97 g/ml at 25° C. result in substance quantity ratios of $n(O):n(Si)=1.02$, $n(C):n(Si)=2.35$ and $n(C):n(O)=2.29$. The ratio between hydrogen and carbon relates to the results of the conventional chemical elementary analysis.

Regarding the substance quantity ratios of the elements silicon, oxygen and carbon, it is generally the case that the plasma polymer product, in relation to 100 atom % for the elements silicon, oxygen and carbon, in total, contains:

| Silicon | 22 to 28 atom % |
|---|---|
| Oxygen | 22 to 30 atom % |
| Carbon | 42 to 55 atom %. |

It is preferable, however, if the plasma polymer product, in relation to 100 atom % for the elements silicon, oxygen and carbon, in total, contains:

| Silicon | 22 to 26 atom % |
|---|---|
| Oxygen | 24 to 29 atom % |
| Carbon | 47 to 51 atom %, |

Here the atom % data relate to the ESCA measurements at settings, which for a trimethylsiloxy-terminated polydimethylsiloxane (PDMS) again used as a standard with a kinematic viscosity of 350 mm$^2$/s at 25° C. and a density of 0.97 g/ml at 25° C. result in 22.9 atom % for silicon, 23.4 atom % for oxygen and 53.75 atom % for carbon; for the tolerances see Table 1 below.

Taking into consideration the preferred weight proportions and substances ratios, an inventive item is particularly preferred whereby the plasma polymer product, with reference to 100 atom % for the elements silicon, oxygen and carbon, in total, contains:

| Silicon | 22 to 28 Atom % |
|---|---|
| Oxygen | 22 to 30 Atom % |
| Carbon | 42 to 55 Atom %, | whereby for the substance quantity ratios in the plasma polymer product the following applies:
$0.75 < n(O):n(Si) < 1.25$
$1.50 < n(C):n(Si) < 2.50$
$1.50 < n(C):n(O) < 2.50$
$2.25 < n(H):n(C) < 3.00$ and
whereby in the ESCA spectrum of the plasma polymer product, compared with a trimethylsiloxy-terminated polydimethylsiloxane (PDMS) with a kinematic viscosity of 350 mm$^2$/s at 25° C. and a density of 0.97 g/ml at 25° C.,
the Si 2p peak has a bond energy that is shifted by 0.44 eV at most to higher or lower bond energies, and the O 1s peak has a bond energy that is shifted by 0.50 eV at most to higher or lower bond energies.

Regarding the ESCA measurement conditions and the standard selected, that stated above applies.

And in a quite particularly preferred inventive item the plasma polymer product with reference to 100 atom % for the elements silicon, oxygen and carbon, in total, contains:

| Silicon | 22 to 26 atom % |
|---|---|
| Oxygen | 24 to 29 atom % |
| Carbon | 47 to 51 atom %, | whereby for the substance quantity ratios in the plasma polymer product the following applies:
$1.00 < n(O):n(Si) < 1.25$
$2.00 < n(C):n(Si) < 2.50$ $1.60 < n(C):n(O) < 2.30$
$2.40 < n(H):n(C) < 3.00$ and
whereby
the Si 2p peak has a bond energy that is shifted by at most 0.40 eV to higher or lower bond energies, and
the O 1s peak has a bond energy that is shifted by 0.40 eV at most to higher or lower bond energies.

Inventive plasma polymer products (as an inventive item or a component of such an item) are, in particular in their preferred designs, stable during hydrolysis and thus crack-free and extendible to extensions of >50% (in preferred designs >100%). Plasma polymer products, which constitute an inventive item or a component of such an item, constitute a flexible barrier to migration. Further, inventive plasma polymer products have non-stick characteristics and, compared with a number of elastomers, better sliding ability (in this connection refer to the sliding characteristics of fluoroelastomers such as Viton®, silicone rubber, India rubber etc.), since the tack that such elastomers normally have is missing or substantially reduced.

Preference is for an inventive item—in particular in one of the designs identified above as being preferable—, whereby (i) the item comprises the plasma polymer product and is a coating (on a substrate) or a part of a coating or a foil with a preferably low coating thickness (here this expressly means a film or foil, which is unsupported and not bonded to a substrate) or (ii) is a composite, comprising a substrate and a coating in the form of a plasma polymer product that can be removed from the substrate non-destructively or not non-destructively, whereby the (i) foil preferably has a thickness in the range 20 to 2,000 nm and (ii) the coating preferably has a thickness in the range 1 to 2,000 nm.

An inventive (unsupported) foil (as an example of an inventive item, consisting of a plasma polymer product) can be manufactured in that, unlike DE 10 2004 026 479, a carrier (for example a very smooth carrier such as a silicon wafer or an aluminium foil or similar or a topographically structured carrier) is coated with a water-soluble substance (such as sugar, salt, a water-soluble lacquer or similar) or is itself water-soluble. On the carrier, which if necessary has a coating in a water-soluble substance, a plasma polymer coating is then deposited, which has the above-mentioned characteristics of an inventive plasma polymer product. The plasma polymer coating can then be removed from the carrier in a water bath without any damage actually being caused. The removed plasma polymer coating (plasma polymer foil) usually has a thickness in the range 20 to 2,000 nm. In the following this will be referred to as a nanofoil.

It is a major advantage of plasma polymerisation technology that foils or coatings with a low thickness of, for example, 1 to 2,000 nm can be produced, which nevertheless have the desired characteristics, in particular concerning elasticity and flexibility. Furthermore, it is possible, for example, to activate a coating on the surface so that following removal, a nanofoil with dehesive surface characteristics on one side and adhesive surface characteristics on the other results.

Particular preference is for an inventive item, in the form of a composite, comprising a substrate and a coating with a thickness in the range 1 to 2,000 nm, whereby the coating itself in turn comprises a plasma polymer product that can be removed from the substrate non-destructively or not non-destructively, and whereby the coating does not allow the passage of molecules with a molar mass of 100 g/mol or more, preferably 50 g/mol or more. Such a composite thus includes a (plasma polymer) permeation barrier to molecules with a molar mass of 100 g/mol (or 50 g/mol) or more. Our own investigations have shown that an inventive plasma polymer foil or coating (as an example of an inventive plasma polymer product) of a very low thickness of sometimes markedly less than 1,000 nm almost completely prevents the passage of molecules with a molar mass of 100 g/mol (preferably 50 g/mol). The foil or the coating is flexible and elastic here, so that in operation no undesired cracks form which could allow the passage of said molecules through the coating.

In particular if the inventive items is a composite of the type just mentioned, it is advantageous if the item is a composite, which as a substrate contains an elastomer and in addition a coating arranged on this with a thickness in the range 1 to 2000 nm, whereby the coating comprises a (an inventive) plasma polymer product that can be removed non-destructively or not non-destructively from the substrate. The advantage of such an item, however, is not in every case its property as a permeation barrier. In other cases, the advantage of an item which contains a elastomer substrate and a plasma polymer coating arranged on this (for example, an inventive plasma polymer product), is that the coating markedly increases the sliding characteristics of the item compared with the untreated substrate since the tack is minimised.

In an inventive item the substrate can also actually be a(an inventive or non-inventive) plasma polymer product, on which a removable or not non-destructively removable plasma polymer product with the structure and composition defined by the specified ESCA data, is arranged. The plasma polymer product used as a substrate here is normally applied to a base substrate, for example in the form of a plasma polymer coating on such a base substrate. Alternatively, the substrate can be a coating that has been applied with PVD, CVD, plasma-enhanced CVD (PE-CVD), galvanically or with the help of a sol-gel method to a base substrate.

In particular, an inventive item can be selected from the group comprising:

- items with a migration block (migration barrier) against molecules with a molar mass of 100 g/mol or more, preferably 50 g/mol or more, including a plasma polymer product as defined above as the migration block (migration barrier) or part of the migration block;
- items with a seal, containing a plasma polymer product as defined above as a seal or seal component;
- optical element with a coating, containing a plasma polymer product as defined above as a coating material;
- items containing a corrosion-sensitive substrate and a corrosion protection coating arranged upon this, containing a plasma polymer product as defined above as the corrosion protection coating or part of the corrosion protection coating;
- items containing a substrate with easy-to-clean coating, containing a plasma polymer product as defined above as the easy-to-clean coating or part of the easy-to-clean coating, in particular for the application in the area of adhesive processing;
- items containing a substrate (in particular also a (technical) textile) with easy-to-clean coating (that is stable during hydrolysis), containing a plasma polymer product as defined above as the easy-to-clean coating (that is stable during hydrolysis) or part of the easy-to-clean coating (that is stable during hydrolysis);
- items containing a substrate (in particular also a membrane) with an easy-to-clean coating (that is stable during hydrolysis) or a hydrophobic finish, containing a plasma polymer product as defined above as the easy-to-clean coating (that is stable during hydrolysis) or hydrophobic finish or part of the easy-to-clean coating (that is stable during hydrolysis) or hydrophobic finish;

items containing a substrate with an antibacterial coating, in particular in accordance with or similar to DE 103 53 756, containing a plasma polymer product as defined above as the (non-cytotoxic) antibacterial coating or part of the antibacterial coating;

items containing a substrate for the manufacture of a packaging with an antibacterial coating, in particular in accordance with or similar to PCT/EP 2004/013035, including a plasma polymer product as defined above as the (non-cytotoxic) antibacterial coating or part of the antibacterial coating;

items containing a substrate, in particular a heat exchanger or parts of a heat exchanger, and a coating arranged on this, including a plasma polymer product as defined above with hydrophobic and stability during hydrolysis characteristics, which preferably scarcely change the measurability of the thermal conductivity at all;

items containing a substrate with plasma polymer separating layer, containing a plasma polymer product as defined above as the separating layer or part of the separating layer;

items containing an elastomer product and a coating that increases the sliding ability on the elastomer product, containing a plasma polymer product as defined above as the coating or a component of the coating;

items containing a substrate, in particular an optical component of a lithographic system, and a residue-free, removable, and preferably pull-off without residue protective foil, containing a plasma polymer product as defined above as the protective foil or part of the protective foil;

items containing a substrate, in particular an optical component of a lithographic system, and a coating, containing a plasma polymer product as defined above arranged on this as protective layer that is stable during hydrolysis, strongly hydrophobic and extensively UV-transparent protective layer;

items containing a preferably plasma polymer coating with a defect and a repair foil for repairing the defect, containing a plasma polymer product as defined above as the repair foil or part of the repair foil;

items containing at least two hard layers or substrates, preferably with barrier characteristics, and at least one soft barrier layer between the hard layers or substrates, containing a plasma polymer product as defined above as the spacer layer or component of the spacer layer;

items containing a barrier coating or a substrate to reduce the migration of gases and vapours, in particular steam, carbon dioxide or oxygen, with a hydrophobic covering layer, containing a plasma polymer product as defined above as the covering layer or component of the covering layer;

items containing a preferably electrical component and an electrically insulating foil or coating, containing a plasma polymer product as defined above as the insulating film or insulating coating or part of such a foil or coating;

items containing a preferably implantable medical engineering object containing a plasma polymer product as defined above. Advantageously the coating, thanks to its dehesive surface characteristics, allows a reduction in adhesion of bacteria, proteins or other endogenous substances (possibly as modified by medicines);

preferably implantable medical engineering silicon items, containing as a coating a plasma polymer product as defined above. In a preferable manner the coating, due to its dehesive and/or extensible surface characteristics, allows an increase in biocompatibility (the inventive coating is particularly suitable in that no lower molecular reaction products are present).

The invention also concerns the use of a plasma polymer product as defined above (as an inventive item or a component of an inventive item) as
 a migration block (migration barrier) against molecules with a molar mass of 100 g/mol or more, preferably 50 g/mol or more;
 an outer layer on a barrier coating or a substrate in order to reduce the migration of gases and vapours, in particular steam, carbon dioxide or oxygen;
 a sealing material, in particular for seals with a maximum thickness of 1,000 nm;
 a flexible coating of a flexible packaging material;
 a foil or coating to coat optical elements;
 a coating that is stable during hydrolysis;
 a hydrophobic coating;
 an antibacterial coating, in particular non-cytotoxic antibacterial coating;
 a corrosion protection coating;
 an easy-to-clean coating;
 the coating of an elastomer product to increase sliding ability;
 a protective and/or UV-transparent foil that is stable during hydrolysis, in particular for optical elements of lithographic systems, with further preference for optical elements of immersion lithography systems;
 a separating layer or part of a separating layer
 a repair foil, in particular for easy-to-clean or separating layer applications or optical applications;
 a foil or coating with dehesive and adhesive surface characteristics;
 a foil with a holed and/or striated pattern, in particular for the coating of hydrophilic substrates for the manufacture of local hydrophilic or hydrophobic areas;
 a soft spacer layer between hard layers or substrates that need to be separated, in particular barrier layers;
 a strongly hydrophobic covering layer, in particular for preventing the adsorption of polar molecules or to improve the barrier characteristics of barrier coatings or ultra-barrier coatings against gases and vapours such as steam, carbon dioxide or oxygen;
 an insulator foil or coating, in particular in electrical components;
 a separating layer or strongly hydrophobic layer on diamond-like coatings, in particular thin coatings chemically bonded to the substrate.

The invention also concerns a method for manufacturing an inventive plasma polymer product (as an inventive item or component of an inventive item) which can be performed as follows:

The easiest way for manufacture to take place is by means of a low-pressure plasma polymerisation process. For this a vacuum reactor is used which, with the help of vacuum pumps, is evacuated at least until for a selected working gas quantity the desired working pressure can be maintained, in particular if the plasma is ignited. A person skilled in the art will also be careful that the gas atmosphere is disturbed as little as possible by residual water (moisture), adhering to the reactor walls or to the coatings found on these (internal leak). He will also ensure that the total external leakage rate of the chambers used is less than 1% of the quantity of oxygen to be introduced into the process. A stable, low leakage rate can, for example, be demonstrated and detected by a leak tester or mass spectrometer. Internal leaks can be minimised by sufficiently long evacuation times (min. ½ hour) or by heating the chamber and likewise demonstrated by a mass spectrometer.

The strict procedure described here, which is time- and cost-intensive, is not necessary for the manufacture of conventional easy-to-clean coatings, since here the introduction of large quantities of oxygen within a certain bandwidth is accepted.

Suitable substrate surfaces can be coated directly, i.e. without pre-treatment, but pre-treatment steps or pre-coating steps, such as cleaning, activation or plasma polymerisation are possible. If an unsupported film (a nanofoil) is to be produced, then a substrate must be selected which allows simple removal. One possibility for this is the coating of a solid that is easily soluble in a fluid, or the coating of such a fluid with a vapour pressure that is well below the selected working pressure. The (solid) matter lending itself to coating is, for example, water-soluble matter or matter that can be dissolved in an organic solvent. In addition the coating can also take place on surfaces on which an extremely low adhesion is expected, such as fluoropolymers or also on parting agents. The latter also offer the option of the parting agent located on the substrate and below the coating being dissolved in organic solvent.

As working gases for the manufacture of the inventive substance, silicon organic precursors, such as hexamethyldisiloxane (HMDSO), octamethyltrisiloxane, tetramethylsilane (TMS) or vinyltrimethylsilane (VTMS), are used. Particular preference is for HMDSO, since this already inherently has the first Si—O—Si— unit, is already saturated with methyl groups and has a comparably high vapour pressure. This precursor is preferably processed together with oxygen. Oxygen as an additional working gas allows not only the addition of the desired proportion of oxygen, but also allows a plasma-chemical "combustion" of the fragments split from the HMDSO.

The plasma can basically be ignited with the help of the various frequencies, but a so-called structure-retaining plasma is preferably selected. This means that the precursor introduced, for example HMDSO, is not completely fragmented in the plasma, but that plasma processing parameters are selected that are moderate enough that, for example, for each precursor molecule only one methyl group is split. As a result a methyl-rich Si—O network can be formed. Such a material can be seriously damaged or destroyed by high ion bombardment, so that HF frequencies (13.56 MHz) are preferred and the substrate is preferably not secured to the electrode. When using GHz frequencies, account has to be taken of the fact that the fragmentation in plasmas generated in this way is high and therefore special care is required.

For the power in terms of the gas quantity introduced, a working range is preferably selected in which work takes place in the precursor surplus. In this way more working gas is available than can be processed by the plasma power introduced. A person skilled in the art will know, for example, that an increase in the power introduced leads to a significant increase in the deposition rate. For adjustment of the gas quantity ratio, for example of HMDSO to oxygen, the following examples can be considered as an aid; a working specification for this cannot be drawn up since with plasma polymerisation the settings of the process parameters are heavily influenced, amongst other things, by the plasma system used. A person skilled in the art, however, will always select an excess of HMDSO. The power must be set taking into account the total gas quantity in each case. Here is it helpful, in preliminary trials, to measure the water contact angle on very smooth, evenly coated specimen bodies, for example a silicon wafer. Measured values in the range of 100° normally indicate a favourable working range, but it is necessary to ensure using a raster electron microscope or by AFM measurements, that the substance manufactured does not lead to any nominal increase in roughness of the substratum ($R_a$<1 nm). If this condition is met, a working range is found which can be characterised and optimised more accurately with the help of XPS measurements.

The coating time is set such that the desired coating thickness is achieved.

For the depositing preferably large volume systems are used, since with these it is considerably easier to set structure-retaining plasma polymerisation conditions, as well as the correct gas ratio, the necessary power and the ratio of gas quantity introduced to the leakage rate.

The inventive method can optionally be carried out using low-pressure or atmospheric pressure plasma polymerisation. If atmospheric pressure plasmas are used, then the effect of foreign gases, such as air or relative humidity must be eliminated as far as possible.

Finally, the invention relates to a plasma polymer product, which can be manufactured in accordance with the inventive method. The characteristics of such a plasma polymer product, generally correspond to those of plasma polymer products, in the way that they have been described above as inventive items or components of such an inventive item. By adjusting the process parameters, gas flow, gas composition, leakage rate, power introduced into the plasma, pressure and distance to the electrode, preferred plasma polymer products or preferred inventive items in terms of structure and characteristics, can be selectively set.

The present invention is explained in more detail using the following description (in particular the fields of application and the embodiments) and by the attached patent claims.

Fields of Application:

In the following preferred fields of application for inventive items (e.g. inventive plasma polymer products) are presented, but without these being intended as a restriction on the application possibilities. A person skilled in the art will, in the knowledge of the characteristics of inventive items, recognise a number of further fields of application.

Field of Application: Migration Barrier

An inventive item can contain or be a plasma polymer migration barrier (migration block) against molecules with a molar mass of 50 g/mol or more, preferably of 100 g/mol or more. Of particular significance here is the barrier effect against organic molecules. Specific examples of the application as a migration barrier are migration barriers for preventing the escape of undesirable substances from a substrate, e.g. as barriers against additives (e.g. plasticisers) from a synthetic substrate (this application is of particular significance for food packaging). An inventive item can accordingly be or contain a food packaging, where the side turned towards the food has a plasma polymer coating applied to it, which itself is an inventive plasma polymer product. In such an item the food packaging itself has the role of a substrate. Examples of food packaging materials which can be sealed against the food by an inventive plasma polymer coating, are plasticised PVC, polyurethane foams and so on. In these specific examples the plasma polymer coating serves to prevent the escape of an undesired substance from the substrate into the food. Of course, as a migration barrier, an inventive plasma polymer coating also, however, prevents the ingress of an undesired substance into a substrate just as well.

A specific example of such a(an inventive, plasma polymer) migration barrier to prevent the ingress of an undesired substance into a substrate is a migration barrier which is arranged on a synthetic substrate and which prevents the ingress of solvents, toxins or dyes from a fluid into the substrate, which could shorten the lifetime of the synthetic substrate, cause an undesired contamination of the substrate or discolour the substrate.

Of particular advantage is the use of the inventive plasma polymer products (as inventive items or components of inventive items), if in addition to the barrier effect one or more of the following technical requirements are met: transparency; low coating thickness of, for example, less than 0.5 µm; high UV stability.

Typical substrates, upon which an inventive plasma polymer coating can be applied, in order to function there as a migration barrier, are foils, sealing materials (e.g. PVC seals in screw caps, in particular in the field of food) rubber seals, packaging (food, pharmaceuticals, cosmetics, medical technology, etc.), textiles, light matrices for UV curing, etc. The plasma polymer migration barriers are physiologically harmless and have a good eco-balance.

In connection with the "migration barrier" field of application, it should be noted that as transparent barrier coatings these days many inorganic layers such as $SiO_x$ or $AlO_x$ are used. These coatings can be manufactured using a number of different vacuum methods, e.g. with PVD, CVD or plasma-enhanced CVD (PE-CVD). With these coatings, given suitable substrate surfaces, from coating thicknesses of 20 nm upwards good barrier characteristics can actually be achieved. From a thickness of approximately 500 nm, however, cracks start appearing in said coatings which makes them permeable again. This also happens with plasma polymer barrier layers of the normal structure known to date. In addition, said coatings are brittle and therefore liable to break. Thus there is a view that for a very good barrier on the basis of the known coating methods a virtually flawless inorganic coating is necessary.

A further disadvantage of the known inorganic coatings is that they are relatively inflexible. With a number of applications a deformation of the substrate surface occurs, which when the said conventional coatings are used leads to the formation of cracks and thus to a loss of the barrier characteristic. Unlike the inorganic migration barriers known to date, e.g. on an $SiO_x$ basis, the inventive plasma polymer products are softer and more flexible.

The present invention thus solves the problem of providing an improved thin-layer coating system, which constitutes a suitable migration barrier.

For the provision of particularly good barrier coating systems, so-called ultra-barrier systems, for example, including for gases and vapours with a low molecular weight, an inventive coating can be used as a spacer layer in a composite of thin layers. For example, it can be used in combination with thin layers which are applied with PVD, CVD or plasma-enhanced CVD (PE-CVD) (as in the highly inorganic $SiO_x$ or $AlO_x$ coatings described above). Here an inventive spacer layer can, for example, reduce the tendency towards crack formation due to internal (mechanical) stresses when the "overall layer thicknesses" are high. In addition, the flexibility of such a layer composite, compared with a barrier layer without the inventive spacer, is increased.

A further improvement of barrier layers or ultra-barrier layers for gases and vapours with a low molecular weight can result from the use of the inventive coating as an outer layer. Due to their highly hydrophobic surface they reduce the adsorption of polar molecules such as water, which often have a decisive influence on the speed of migration.

Field of Application: Stability During Hydrolysis

Coatings that are stable during hydrolysis are required in a various areas.

For example, thin layer coatings which are stable during hydrolysis and hydrophobic, and which do not hinder thermal conductivity, are needed in the area of heat exchangers. With heat exchangers saturated steam atmospheres at high pressures often occur. The heat exchanger surfaces, on the other hand, are comparatively cool, so that moisture condenses onto them. In order that no film of water forms on the heat exchanger surfaces, it is an advantage if these surfaces have a hydrophobic finish, in order to prevent the formation of a water film which would also have to be cooled and would prevent thermal conduction. A heat exchanger, whose heat exchanger surfaces are provided with an inventive plasma polymer coating (as an example of an inventive plasma polymer product), whose ESCA data correspond to the ESCA data indicated in connection with the inventive items, is an example of a preferred inventive item.

A further field of application for coatings that are stable during hydrolysis is in the area of paper manufacture. In the paper manufacturing area coatings that are stable during hydrolysis with non-stick characteristics are required, in order to prevent adherence of so-called "stickies". It has been shown that the adherence of stickies can be completely or at least to a large extent prevented by providing the relevant parts of a paper manufacturing system with an inventive plasma polymer coating, whose ESCA data correspond to the ESCA data indicated above for an inventive plasma polymer product.

Similarly the inventive coating can be applied as a hydrolysis protection outer layer to other thin layer systems, which for their part for example have been applied with PVD, CVD, plasma-enhanced CVD (PE-CVD), plasma polymerisation, galvanically or in a sol-gel process. Inorganic coatings such as $SiO_x$ and $AlO_x$ coatings, in particular, despite their good corrosion protection characteristics demonstrate, for example on anodised aluminium substrates, a comparatively low stability during hydrolysis and are preferably provided with an inventive coating.

Field of Application: Non-Stick Characteristics/Easy-to-Clean Characteristics

For a number of tools and machines, non-stick characteristics and/or easy-to-clean characteristics are desired. In this connection tools and machines (such as bookbinding machines, adhesive application appliances, sealing systems, printing machines and laminators) can be mentioned as they come into contact with adhesives (such as hot-melts, single component and double component adhesives with or without solvent, or cold glue). Examples are storage containers, pumps, sensors, mixers, pipelines, application heads and so on. In the area of sensors, in particular, there is a special need for non-stick coatings or easy-to-clean coatings, which cover the entire sensor and do not adversely affect the sensor characteristics. The application of an inventive plasma polymer coating (with ESCA data as indicated above for a plasma polymer product) is particularly advantageous here, since it allows the entire sensor to be coated without adversely affecting the sensor characteristics. In addition, the surface energy of an inventive coating is generally so low that even common solvents such as acetone no longer spread over the surface—the surface energy of the coating is below that of the solvent. In this way the run-off and cleaning behaviour of adhesives containing solvents is improved.

An inventive item, for example, can be a moulding tool with a permanent release coating, whereby the permanent release coating is actually an inventive plasma polymer product, whose ESCA data are given above. Moulding tools with a permanent release coating and methods for their manufacture are disclosed in EP 1 301 286 B1, whereby there it is, however, essentially established that in the release coating through a timed variation in the polymerisation conditions during the plasma polymerisation a gradient coating structure is created. Within an inventive item also, which contains an inventive plasma polymer product as a release coating, the plasma polymer product can have a gradient coating structure. All that is necessary, however, is that an ESCA investigation (of the surface) of the plasma polymer product leads to the abovementioned results. Furthermore, it can be an advantage, in addition to a permanent release coating with a gradient coating structure on a moulding tool, to provide an inventive plasma polymer coating (an inventive plasma polymer product), which in an ESCA investigation demonstrates the abovementioned bond energy values. In such a case, the inventive plasma polymer product (the inventive plasma polymer coating) also performs the function of a flexible outer layer which supports the sliding characteristics on the permanent release coating, and which itself has release characteristics. Simplified embodiments dispense with the gradient coating structure in the release coating.

Due to the extensibility of inventive products it is possible to provide flexible products, such as foils (in particular extensible foils) with a corresponding non-stick or easy-to-clean surface.

Field of Application: Improved Sliding Characteristics

This aspect of the invention concerns in particular inventive items containing an elastomer product and a coating that increases the sliding ability on the elastomer product, containing a plasma polymer product as defined above as a coating or component of the coating.

Many elastomer products such as O-rings or seals can be provided with an inventive plasma polymer product as a coating or component of the coating, without the coating becoming cracked, if the elastic characteristics of the substrate (the elastomer product) are put under stress.

A number of the elastomers currently used have poor sliding characteristics, so that the corresponding elastomer products can only be processed in automatic loading machines with difficulty. The elastomer products have an interfering surface adhesiveness (tack). For example, in the technical area of valves such a tack can make itself felt in a negative manner if only the slightest detaching forces are expected. A further aggravating factor in this field of application is that the substances causing the tack, are transferred to the valve seat and over time may lead to leaky valves. It is therefore an advantage to provide the elastomers used with an inventive plasma polymer coating, as described above, since this provides special sliding and separating characteristics at high extensibility. Here the elastomer and plasma polymer coating (plasma polymer product) also together form an inventive item.

A further special field of application is the improvement of the sliding characteristics of silicon rubber, which both in the industrial/technical area and, for example, in the area of medical technology, leads to a number of advantageous items. A corresponding inventive item here contains an inventive plasma polymer coating (as described above).

For both the abovementioned fields of application, the inventive plasma polymer coating also ensures that these products cannot diffuse any vulcanisation residue products, no plasticisers or other additives with a molar mass of, for example, more than 50 g/mol. In this way improved suitability in the area of food processing, pharmaceuticals and medical engineering is achieved.

Field of Application: Antibacterial Coatings

Non-cytotoxic, antibacterial coatings in accordance with DE 103 53 756 are preferably manufactured with the help of SiOx-like coatings. The SiOx-like coatings known to date are in fact flexible in the preferred layer thickness of approximately 30-60 nm and can be applied to a foil for application, but in no way is such a coating equal to the loadings which occur, for example, in a deep-drawing process or from buckling or deformation or injection moulding or in-mould decorating or laminating. Furthermore, corresponding surfaces define certain adhesion characteristics (for bacteria, mould, endogenous matter, etc.). The application of inventive plasma polymer items as an SiOx-like coating or in addition to an SiOx-coating, extends from both points of view the usage possibilities. In particular, the high flexibility and extensibility of the inventive items allow substrate shaping further processing techniques such as deep drawing, beading, embossing, and so on. Thus, for example, even tubes or foam films can be finished in this way.

Furthermore, such a product when applied to a corresponding laminating foil or also directly, is also suitable for food packaging. Use in the composite foils sector is of particular interest, since in this way, for example, blocking layer characteristics can be combined with antibacterial characteristics.

Other Fields of Application:

An inventive plasma polymer product can be advantageously used in a number of additional (inventive) items. The following, in particular are worth noting: seals (as a plasma polymer product) in the sub-micrometer field; coatings (as a plasma polymer product) of metal components or semi-finished products, in particular as corrosion protection coatings and/or hydrophobic coatings of such metal components or semi-finished products, in particular for components or semi-finished products which during further processing or in normal use are subject to deformations; coatings (as a plasma polymer product) in combination with other plasma polymer coatings (incorporation in multilayer or gradient layers); coatings (as a plasma polymer product), which bond to a plasma-assisted pre-treated substrate surface and together with the substrate form an inventive item.

The invention is explained in the following in greater detail with the help of examples:

EXAMPLE 1

Manufacture of an Inventive Plasma Polymer Product

In order to manufacture the inventive plasma polymer product A the following process parameters were used:

| | |
|---|---|
| Gas flow $O_2$: | 12 Sccm |
| Gas flow HMDSO: | 50 Sccm |
| Power (W): | 450 |
| Time (sec.): | 2,700 |
| Pressure (mbar): | 0.02 |

In order to manufacture the inventive plasma polymer product B the following process parameters were used:

| | |
|---|---|
| Gas flow $O_2$: | 12 Sccm |
| Gas flow HMDSO: | 50 Sccm |
| Power (W): | 450 |

-continued

| Time (sec.): | 3,000 |
|---|---|
| Pressure (mbar): | 0.02 |

Before proceeding it was ensured that the leakage rate (external leaks) of the vacuum chamber was markedly lower than $2\times10^{-3}$ mbar L/sec. The internal leakage rate was also checked with the help of a mass spectrometer. Here is was ensured that the process was only started once at high sensitivity of the spectrometer the measured value for the mass 18 (water) had fallen sharply and was then constant.

Following production of the coating on an object carrier in quartz glass and switching off of the plasma the gas atmosphere was replaced as soon as possible with hydrogen and then the suction power was reduced so that a marked increase in pressure to around 0.2 mbar was observed. This state was maintained with a constant hydrogen flow for 5 minutes, in order to allow any radicals present to be saturated with hydrogen.

The attached FIGS. 1 to 6 show as follows:
FIG. 1: Curve of the refractive index as a function of the wavelength
FIG. 2: Transmission curve of a quartz glass coated with the inventive item (PP-PDMS) compared with the uncoated quartz glass and a quartz glass coated with PDMS oil (here approximately 200 nm AK50, Wacker Chemie) in the wavelength range 190 to 250 nm
FIG. 3: FTIR spectrum of the inventive coating
FIG. 4: FTIR spectrum of the inventive coating (detailed view)
FIG. 5: FTIR comparison spectrum of an easy-to-clean coating
FIG. 6: FTIR comparison spectrum of an easy-to-clean coating (detailed view)

EXAMPLE 2

Manufacture of an Inventive Plasma Polymer Product

A second possibility for manufacturing the inventive plasma polymer product is provided by the following process parameters:

| Gas flow $O_2$: | 36 Sccm |
|---|---|
| Gas flow HMDSO: | 170 Sccm |
| Power (W): | 1,600 |
| Time (sec.): | 600 |
| Pressure (mbar): | 0.025 |

Here also, prior to proceeding, it was ensured that the leakage rate (external leaks) of the vacuum chamber used was markedly less than $2\times10^{-3}$ mbar L/sec. The internal leakage rate was also checked with the help of a mass spectrometer. Here is was ensured that the process was only started once at high sensitivity of the spectrometer the measured value for the mass 18 (water) had fallen sharply and was then constant.

Further treatment with hydrogen was not carried out.

EXAMPLE 3

Method for Manufacturing an Inventive Unsupported Foil

A very smooth silicon wafer was coated with a water-soluble substance (sugar).

A sugar solution prepared with 0.4 g/ml refined sugar in water was applied to a silicon wafer. Once the water had evaporated a (n inventive) plasma polymer coating was applied to the sugar coating of the wafer by means of the method described in Example 1.

The coating applied was removed from the substrate in a water bath, whereby the water bath dissolved the intermediate sugar coating. Here it was advantageous for the coating at the edge of the wafer to be cut off using a knife. The plasma polymer coating was able to be removed as an unsupported foil (as an example of an inventive item comprising a plasma polymer product) from the water bath. This was simplified by the fact that the unsupported foil was floating on the surface of the water. Its thickness was thus less than 1 g/cm$^3$.

The plasma polymer foil had a thickness of approximately 500 nm.

EXAMPLE 4

ESCA Measurements

ESCA spectra were taken from the inventive plasma polymer products "A" and "B", manufactured in accordance with Example 1, as well as from a reference material and a comparison product, and evaluated. The results are shown in the following Table 1, in which reference is made to the bond energy positions of the signals and the FWHM (Full Width at Half Maximum) of the individual peaks. A plasma polymer easy-to-clean coating in accordance with DE 101 31 156 A1 was selected as the comparison product.

The ESCA investigations were performed using the KRATOS AXIS Ultra spectrometer from Kratos Analytical. The analysis chamber was fitted with an X-ray source for monochromatised Al $K_\alpha$ radiation, an electron source as the neutraliser and a quadrupole mass spectrometer. The system also had a magnetic lens, which focused the photoelectrons via an entry slot into a hemispherical analyser. By means of calibration the aliphatic portion of the C 1s peak was set at 285.0 eV. During the measurement the normal to the surface was pointed at the entry slot of the hemispherical analyser.

The analyser energy when determining the Substance quantity ratios was 160 eV in each case, and the corresponding spectra were referred to as general spectra. In the determination of the peak parameters the analyser energy was 20 eV in each case.

The stated measurement conditions are preferred in order to allow a broad independence from the spectrometer type and in order to identify inventive plasma polymer products.

The reference material used was the polydimethylsiloxan silicone oil DMS-T23E from Gelest Inc. (Morrisville, USA). This trimethylsiloxy-terminated silicone oil has a kinematic viscosity of 350 mm$^2$/s ($\pm 10\%$) and a density of 0.970 g/ml at 25° C. and an average molecular weight of approximately 13 650 g/mol. The material selected is characterised by an extremely low proportion of vaporisable components: after 24 hours at 125° C. and 10$^{-5}$ Torr vacuum less than 0.01% volatile components were detected (in accordance with ASTM-E595-85 and NASA SP-R0022A). With the help of a spin-coating process a 40 or 50 nm thick coating was applied to a silicone wafer; here hexamethyldisiloxane was used as the solvent.

Figure 7:
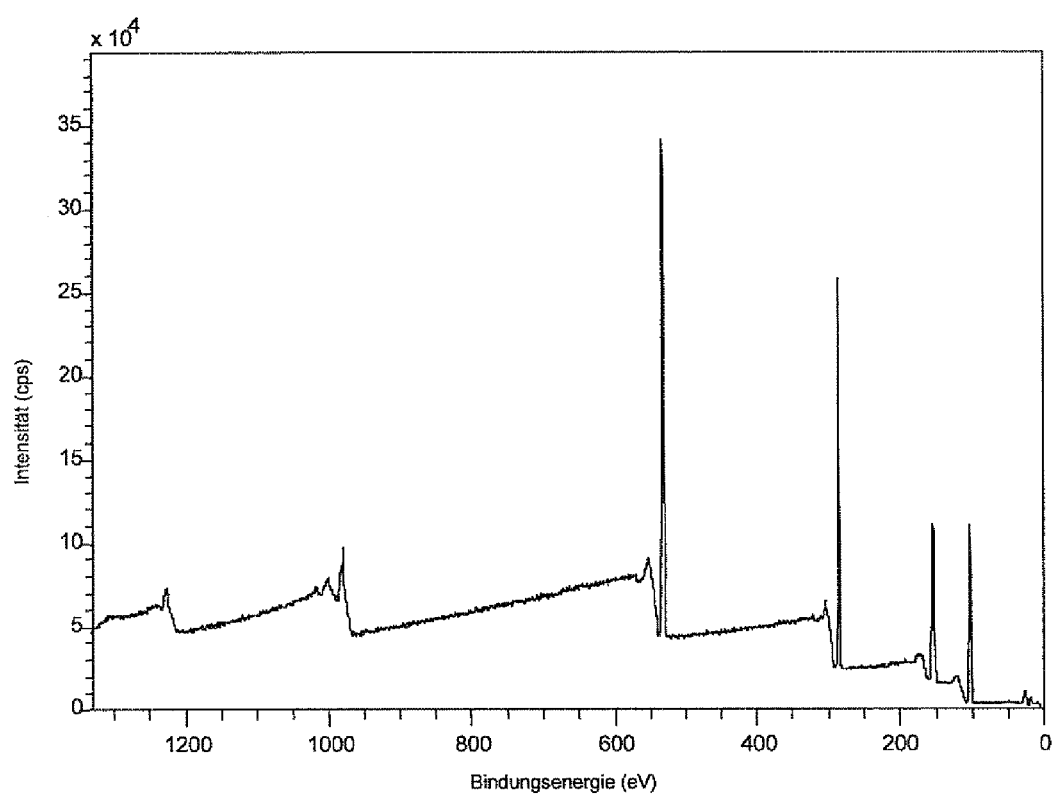

The spectra measured are—for the general spectra, by way of example, in each case the same—attached as FIGS. 7 to 10 (general spectra), and 11 to 22 (detailed spectra). These show as follows:

FIG. 7: XPS general spectrum of the DMS-T23E

Figure 8:
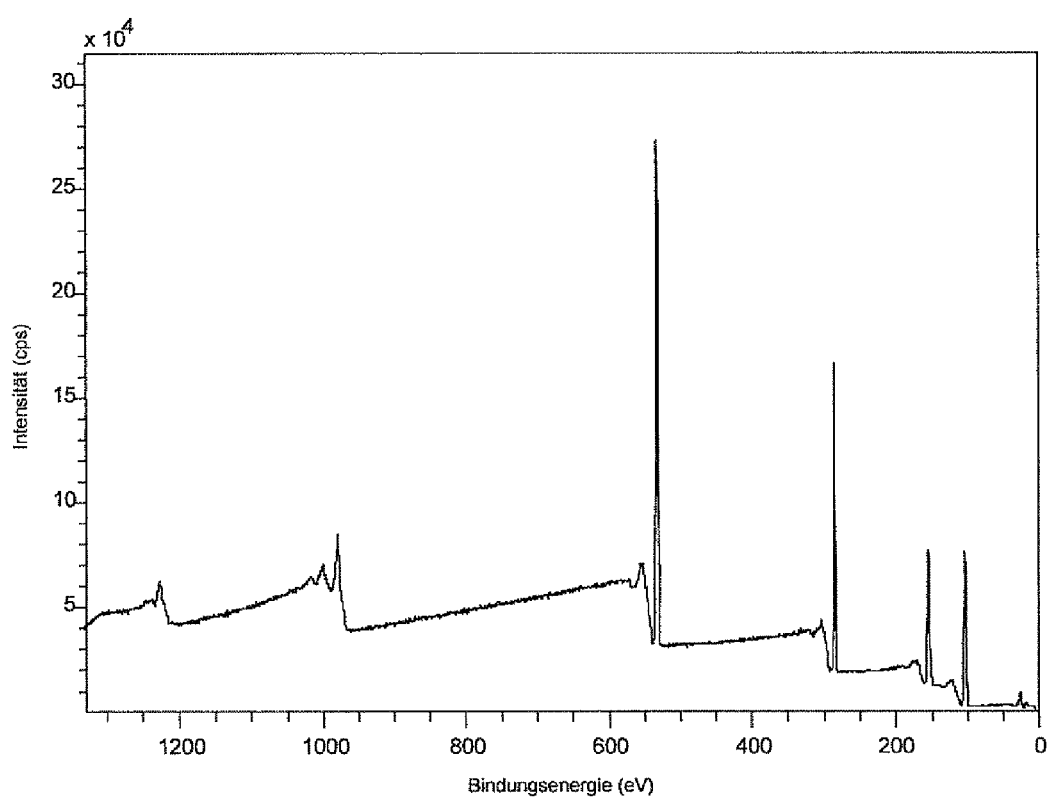

FIG. 8: XPS general spectrum of the inventive plasma polymer product A

Figure 9:
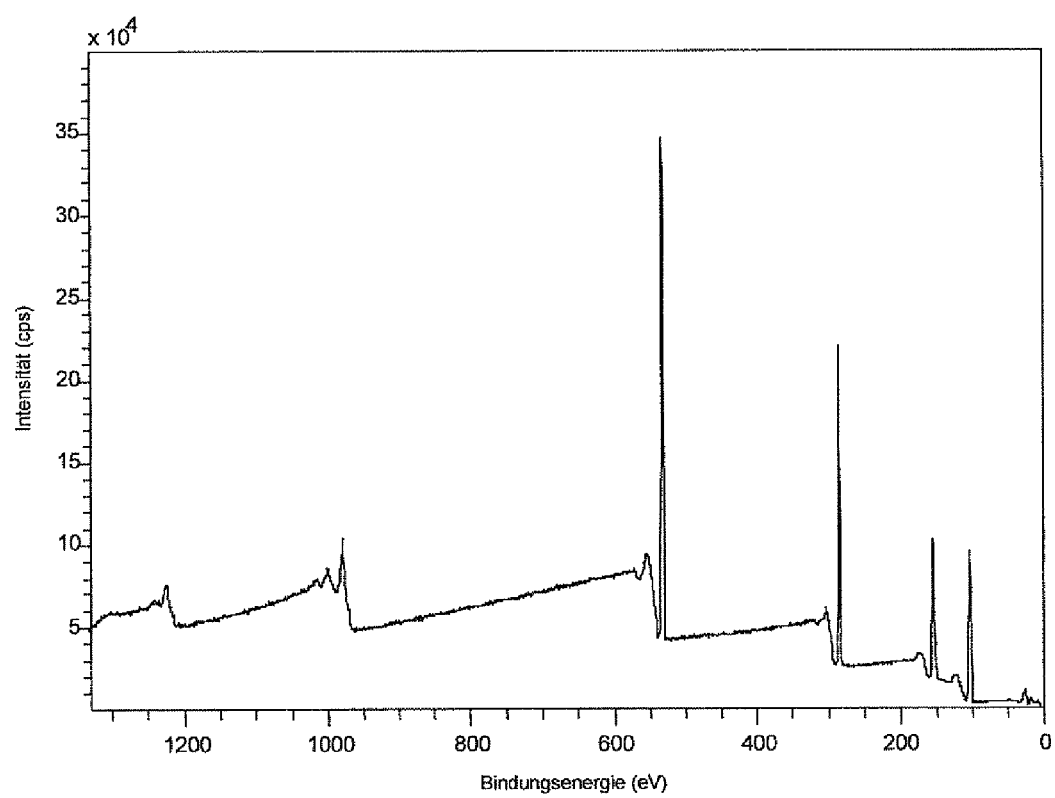

FIG. 9: XPS general spectrum of the inventive plasma polymer product B

Figure 10:
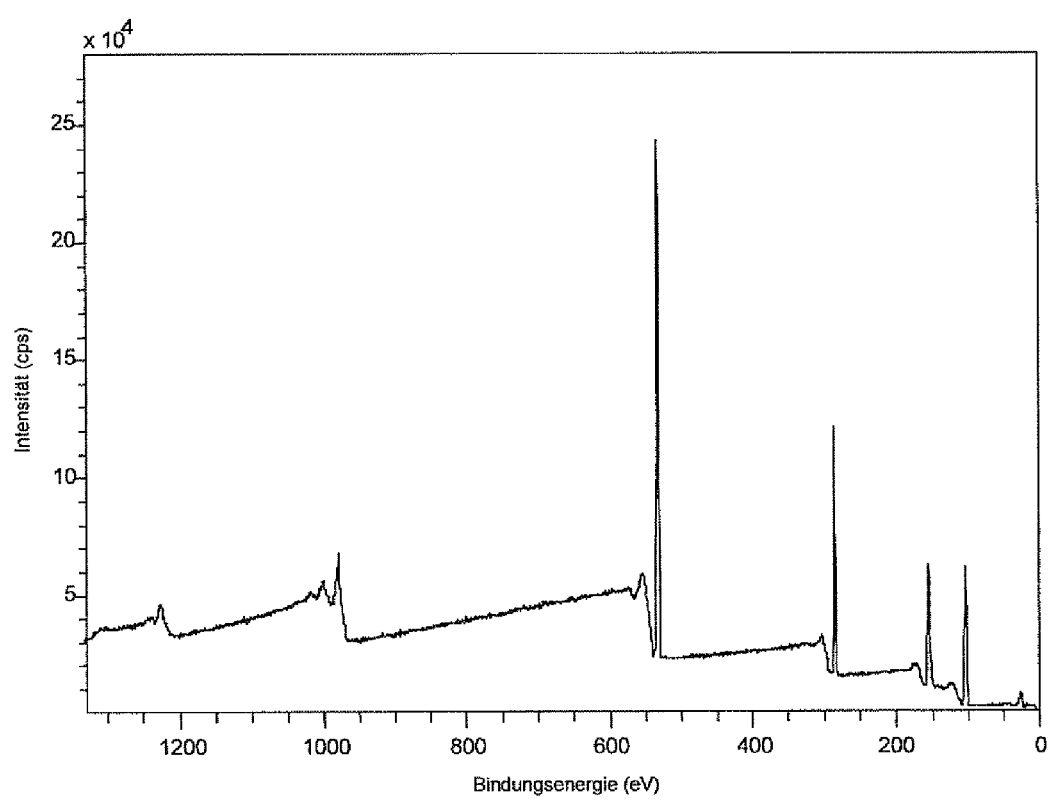

FIG. 10: XPS general spectrum of the easy-to-clean coating in accordance with DE 101 31 156 A1 (comparison)

Figure 11:
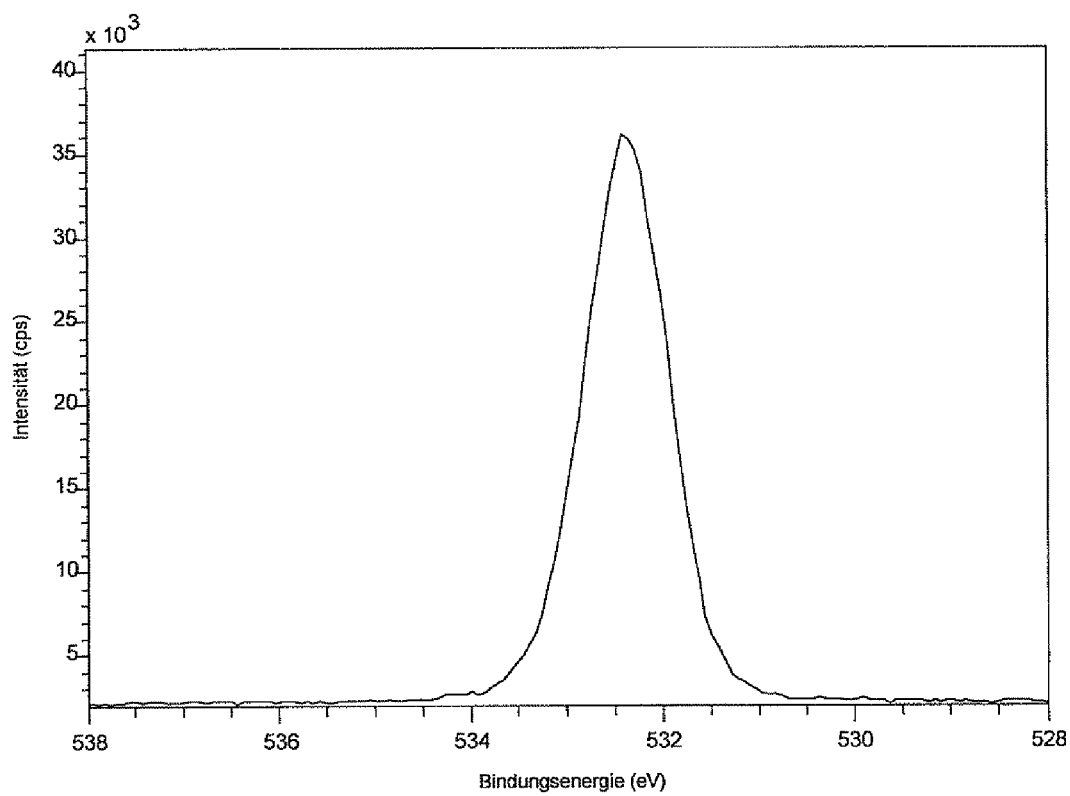

FIG. 11: XPS detailed spectrum of the O 1s peak of the DMS-T23E

Figure 12:
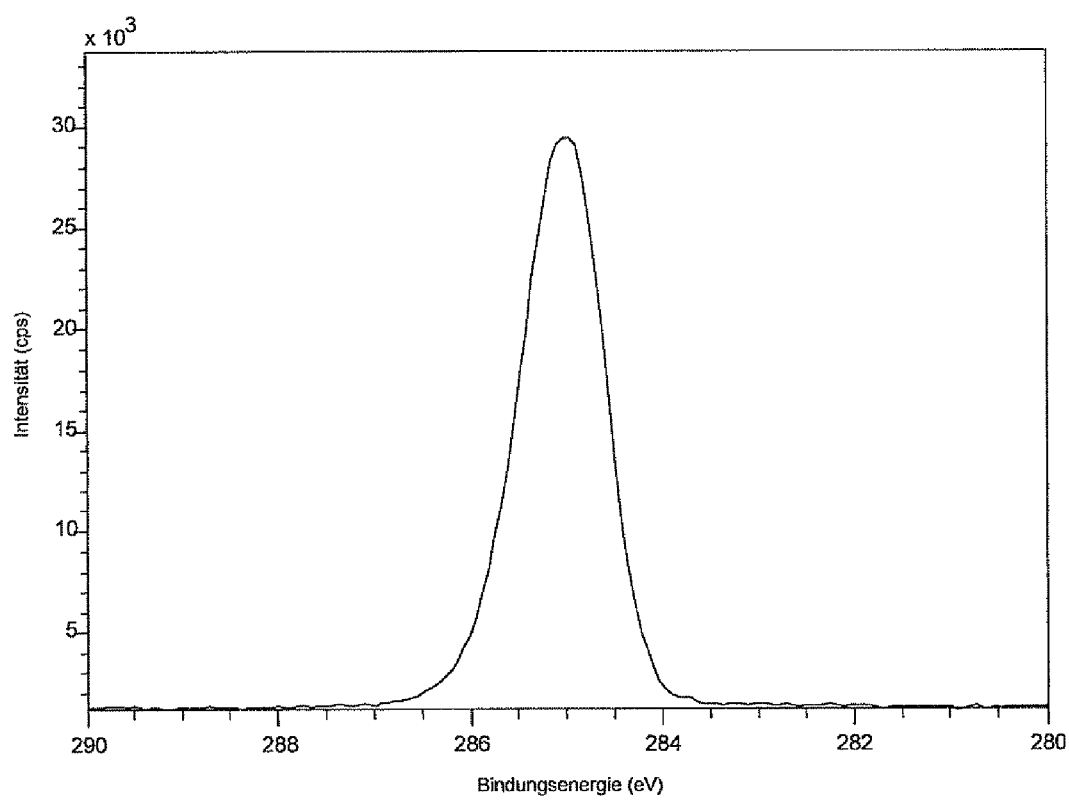

FIG. 12: XPS detailed spectrum of the C 1s peaks of the DMS-T23E

Figure 13:
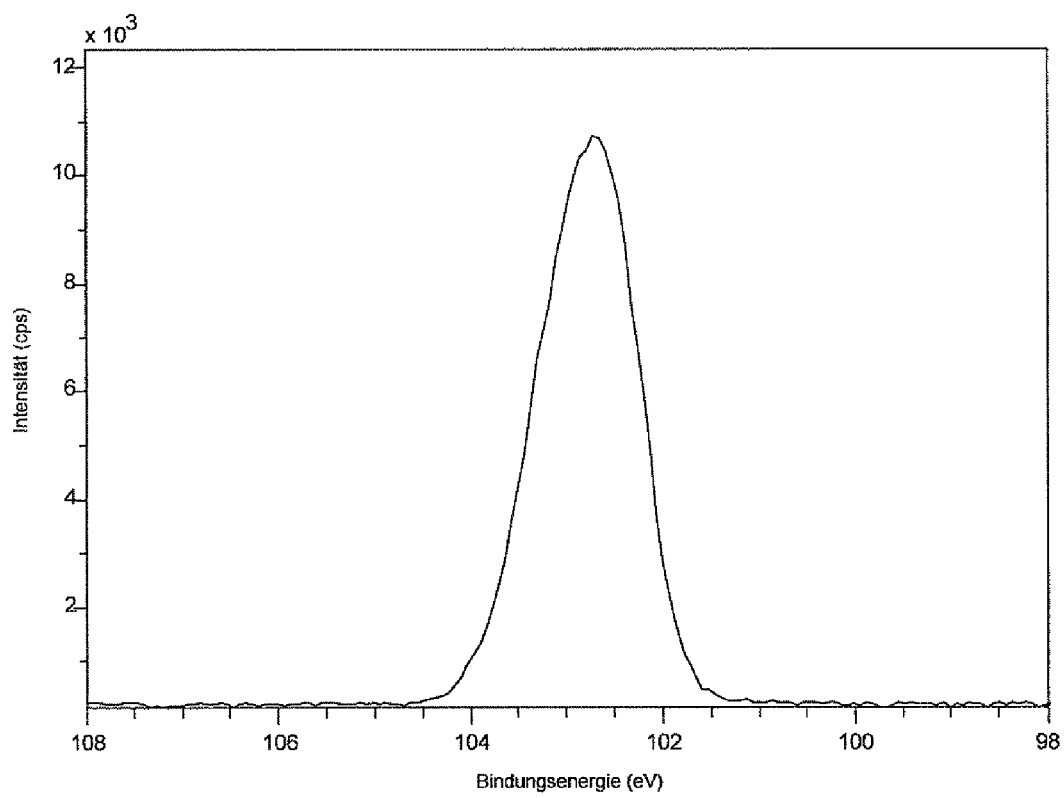

FIG. 13: XPS detailed spectrum of the Si 2p peak of the DMS-T23E

Figure 14:
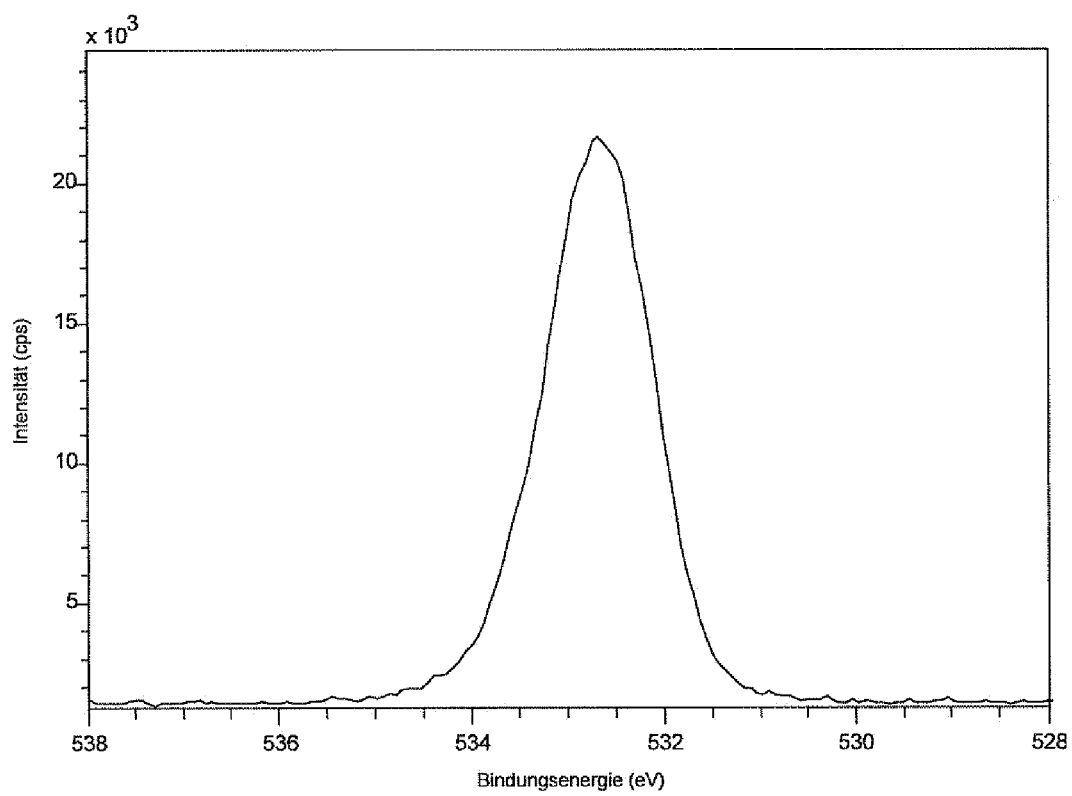
Figure 15:
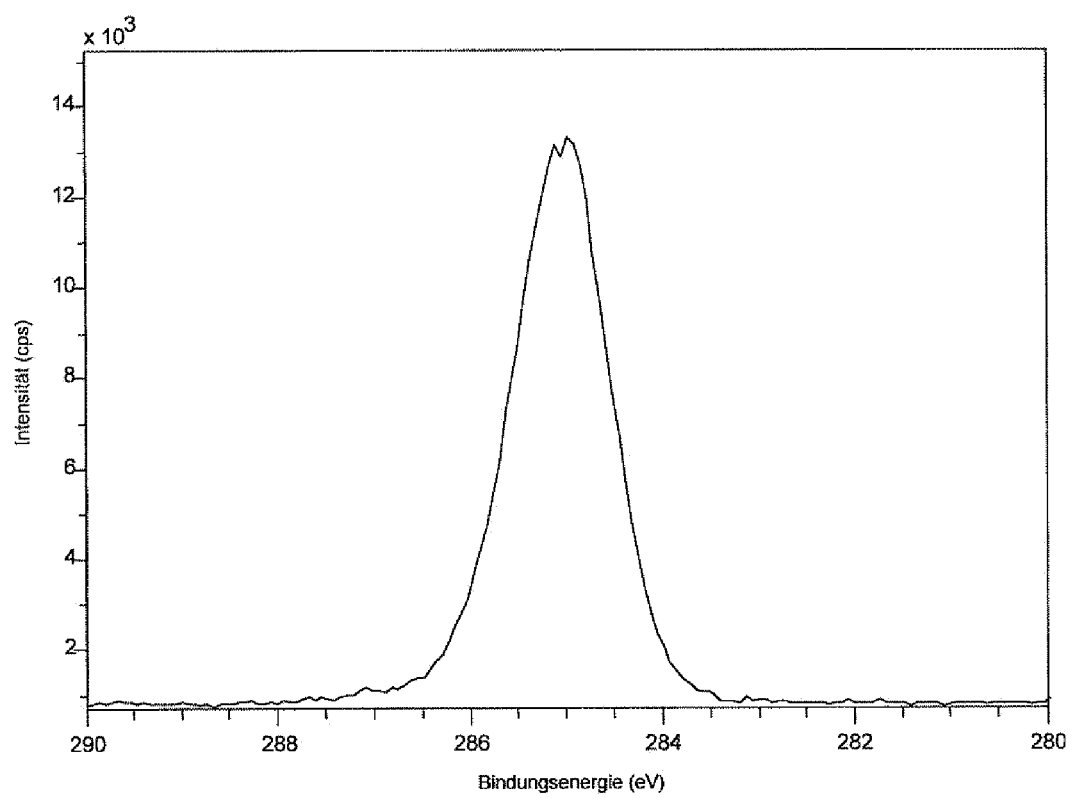
Figure 16:
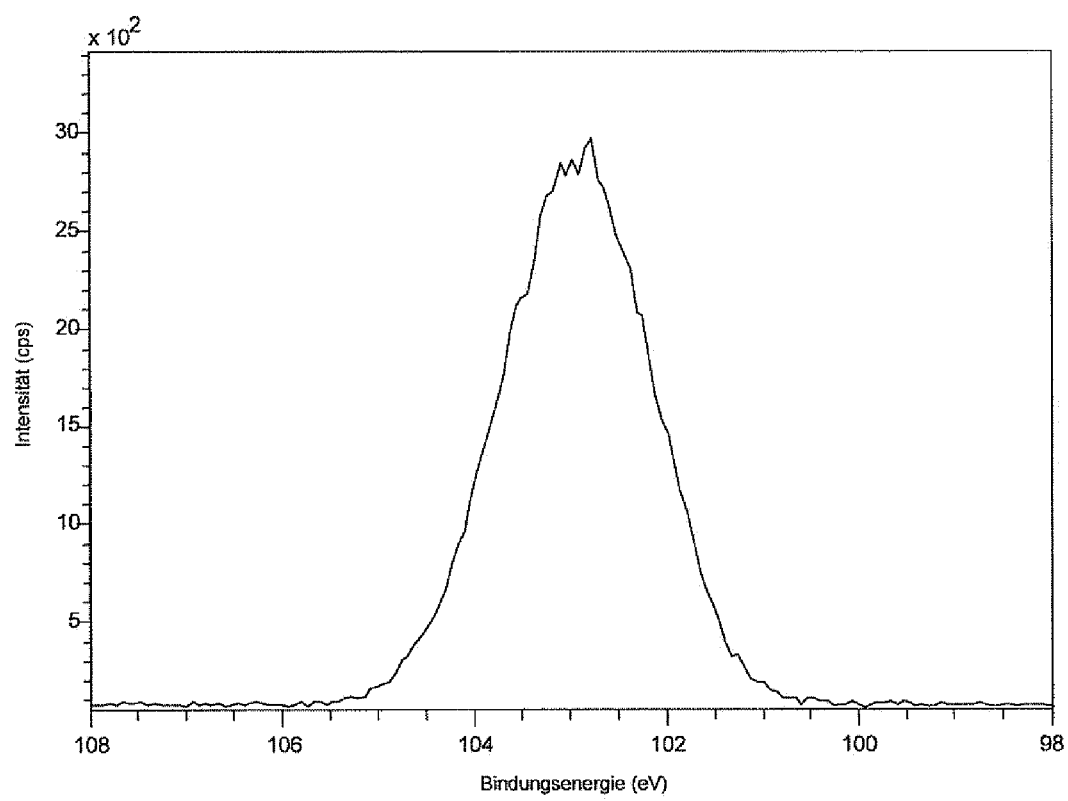
Figure 17:
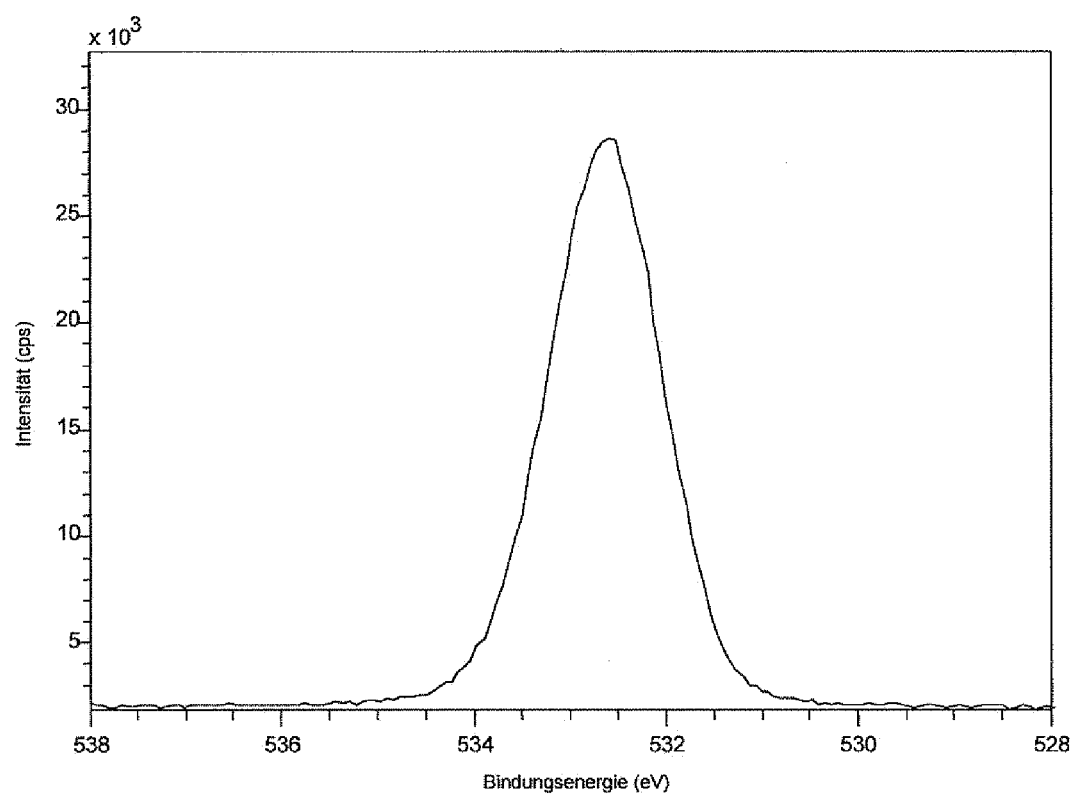
Figure 18:
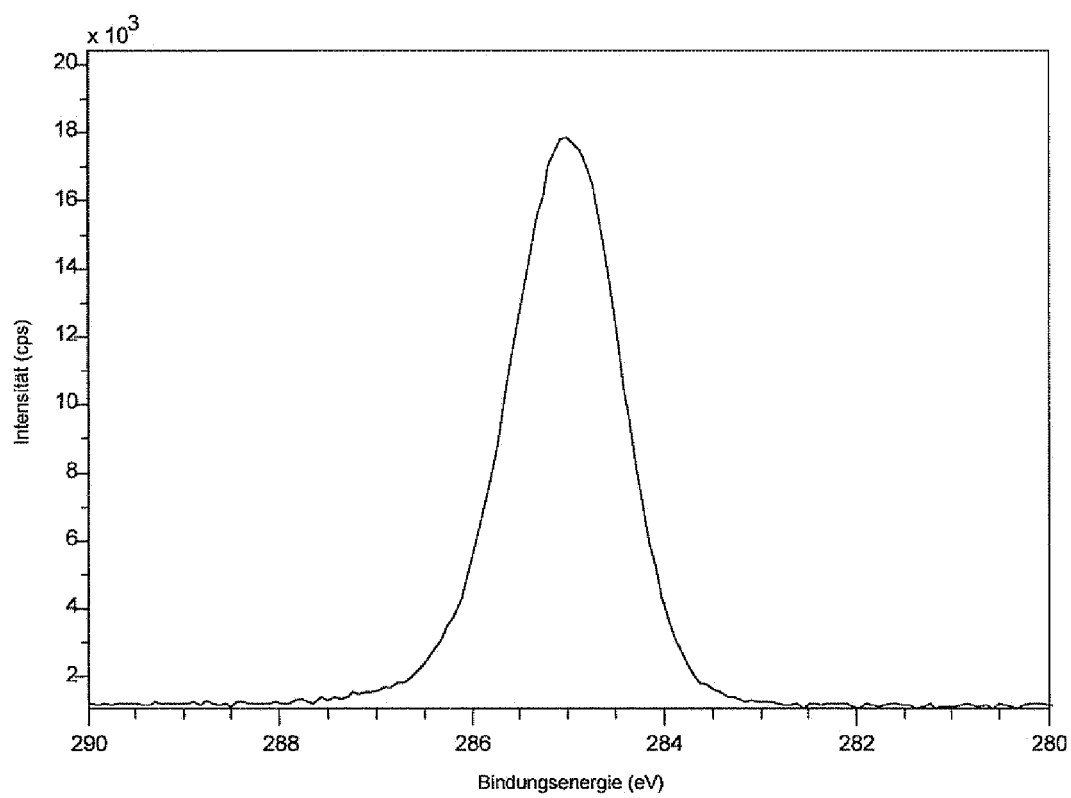
Figure 19:
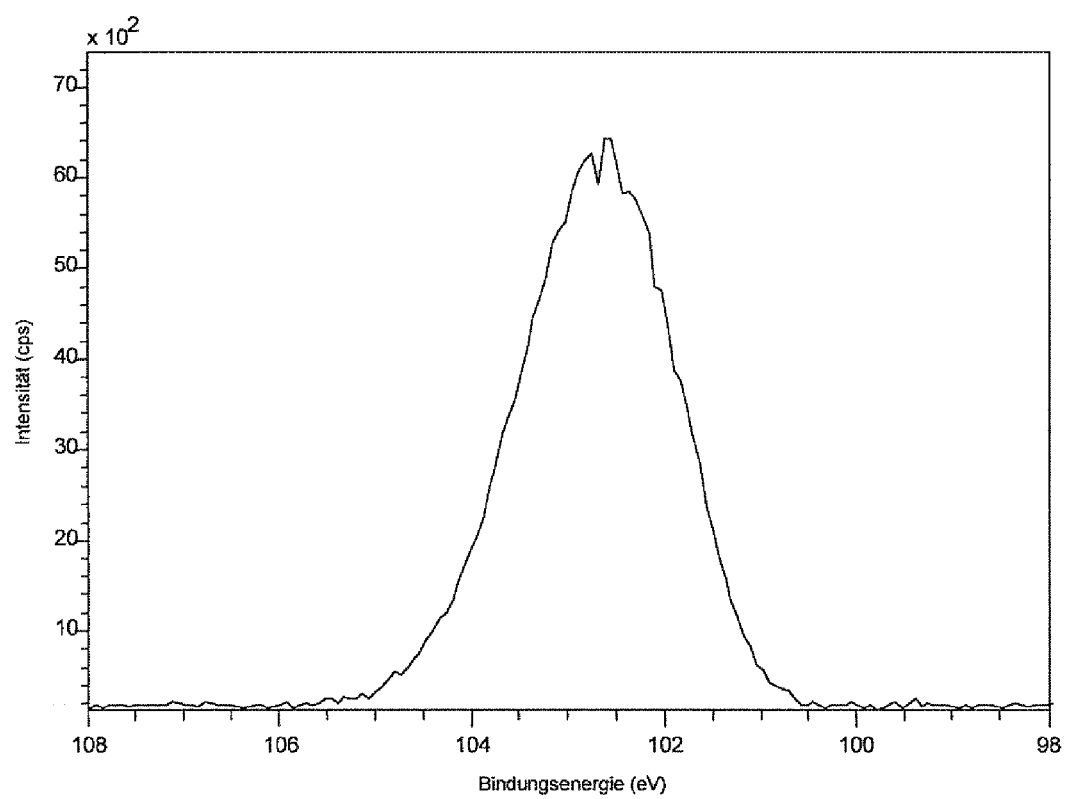
Figure 20:
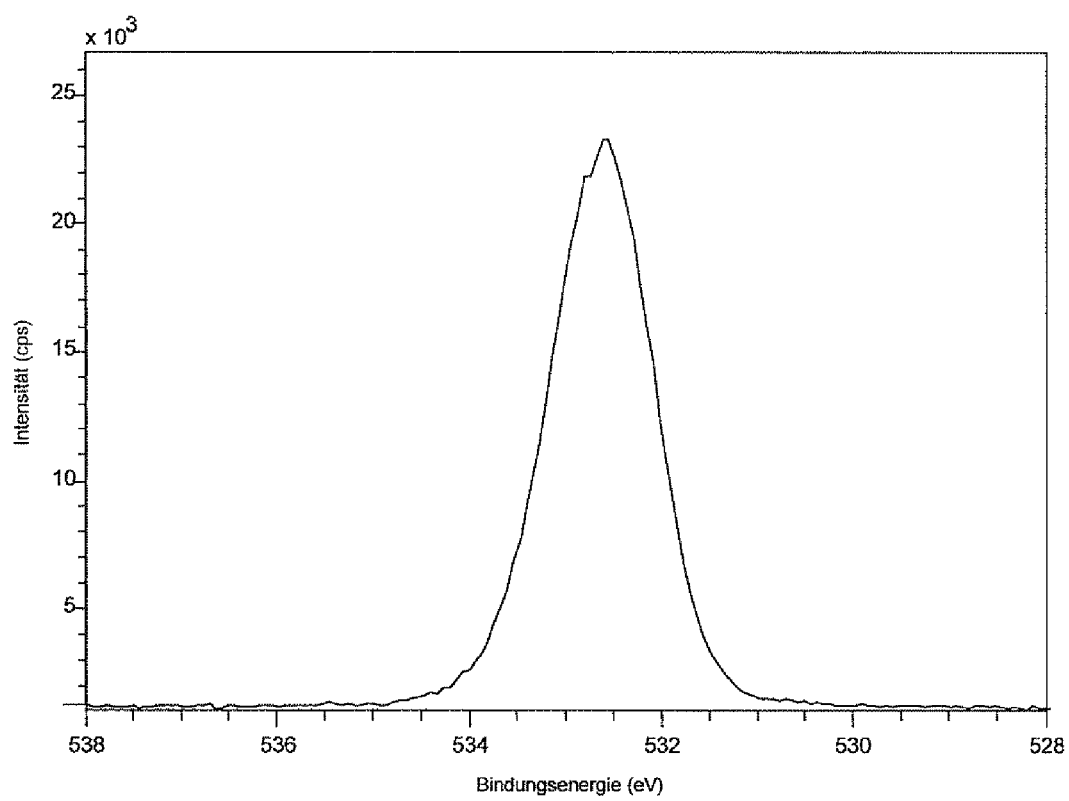

FIG. 14: XPS detailed spectrum of the of the O 1s peak of the inventive plasma polymer product A FIG. 15: XPS detailed spectrum of the C 1s peak of the inventive plasma polymer product A FIG. 16: XPS detailed spectrum of the Si 2p peak of the inventive plasma polymer product A FIG. 17: XPS detailed spectrum of the O 1s peak of the inventive plasma polymer product B FIG. 18: XPS detailed spectrum of the C 1s peak of the inventive plasma polymer product B FIG. 19: XPS detailed spectrum of the Si 2p peak of the inventive plasma polymer product B FIG. 20: XPS detailed spectrum of the O 1s peak of the easy-to-clean coating in accordance with DE 101 31 156 A1 (comparison)

Figure 21:
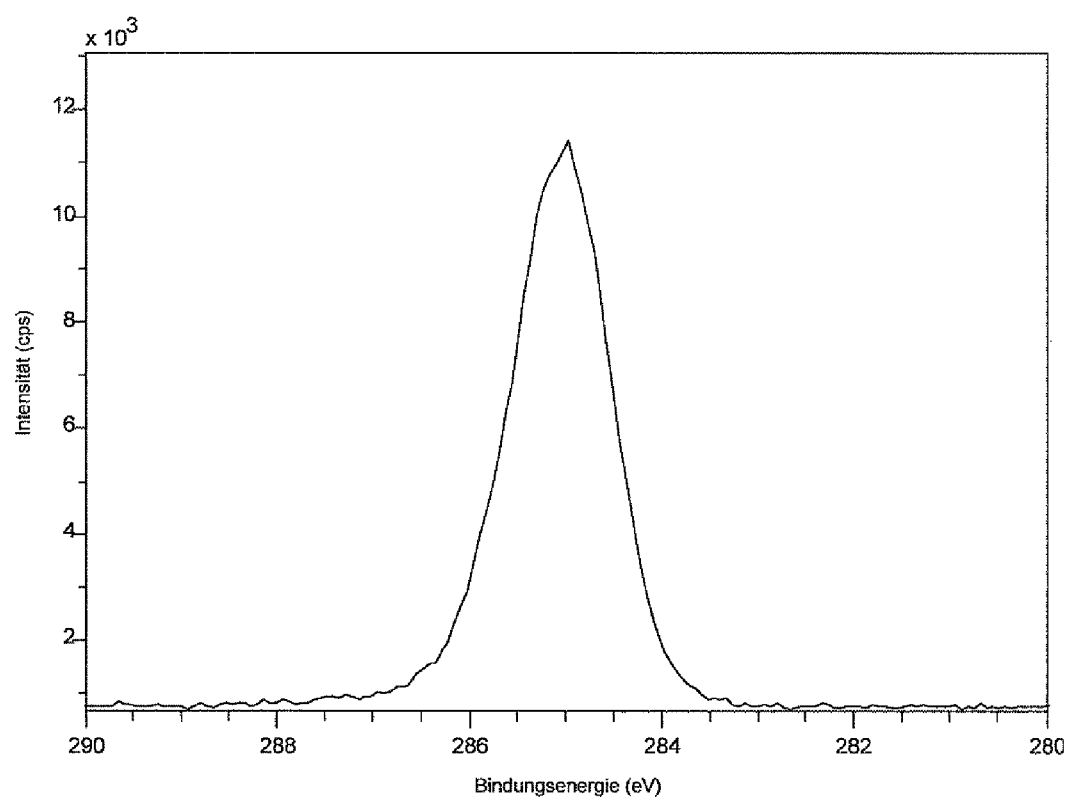

FIG. 21: XPS detailed spectrum of the C 1s peak of the easy-to-clean coating in accordance with DE 101 31 156 A1 (comparison)

Figure 22:
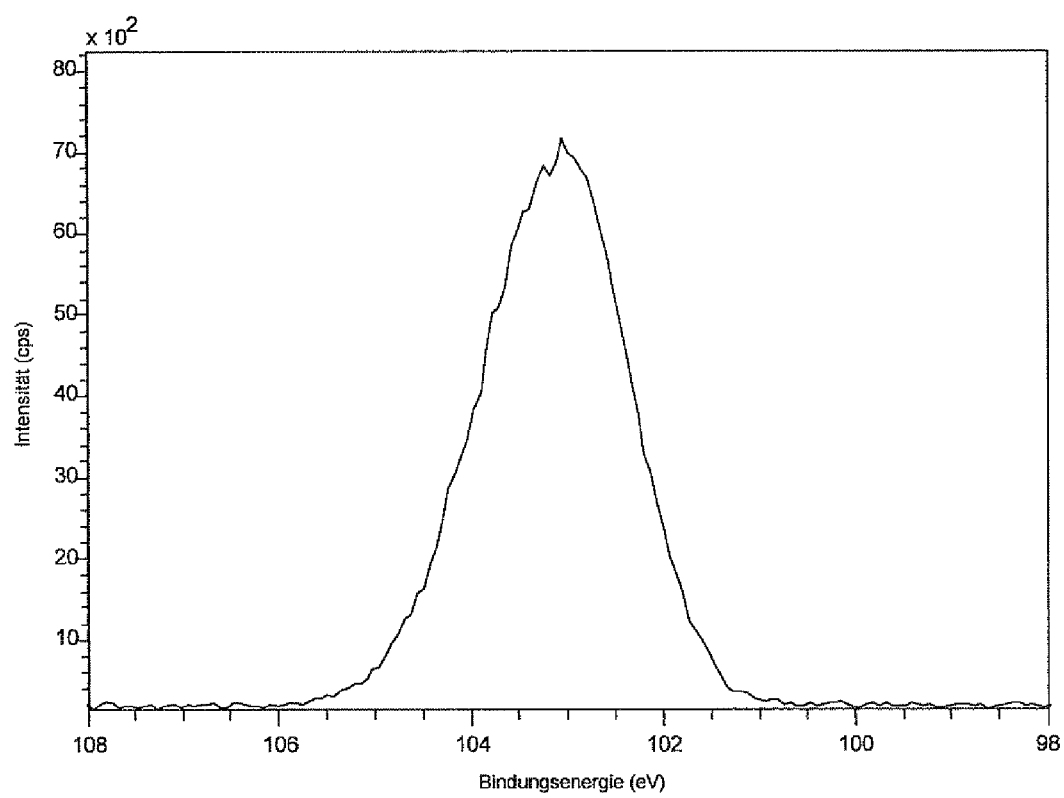

FIG. 22: XPS detailed spectrum of the Si 2p peak of the easy-to-clean coating in accordance with DE 101 31 156 A1 (comparison)

For the general spectra between four and six measurements were carried out at various positions on the specimens. Table 1 shows with ± the maximum deviations from the mean of the measurements carried out.

TABLE 1

Results of the ESCA measurements

| | O 1s Quantity in at % Energy max. [eV] FWHM [eV] | C 1s Quantity in at % Energy max. [eV] FWHM [eV] | Si 2p Quantity in at % Energy max. [eV] FWHM [eV] | Substance quantity ratios |
|---|---|---|---|---|
| PDMS - oil | 23.4 ± 0.3 | 53.75 ± 0.35 | 22.9 ± 0.3 | O/Si = 1.02 ± 0.03 |
| DMS-T23E | 532.46 | 285.0 | 102.69 | C/Si = 2.35 ± 0.03 |
| (Reference) | 1.01 | 1.00 | 1.19 | C/O = 2.29 ± 0.04 |
| Inventive | 27.2 ± 0.7 | 48.8 ± 0.7 | 24.02 ± 0.3 | O/Si = 1.13 ± 0.03 |
| plasma | 532.71 | 285.0 | 102.77 | C/Si = 2.03 ± 0.05 |
| polymer | 1.29 | 1.15 | 1.77 | C/O = 1.80 ± 0.07 |
| product A | | | | |
| Inventive | 26.0 ± 0.2 | 50.2 ± 0.1 | 23.8 ± 0.2 | O/Si = 1.10 ± 0.02 |
| plasma | 532.58 | 285.0 | 102.61 | C/Si = 2.11 ± 0.01 |
| polymer | 1.37 | 1.35 | 1.90 | C/O = 1.93 ± 0.02 |
| product B | | | | |
| Easy-to-clean- | 30.7 ± 0.5 | 44.7 ± 0.6 | 24.6 ± 0.4 | O/Si = 1.25 ± 0.02 |
| coating | 532.64 | 285.0 | 103.14 | C/Si = 1.82 ± 0.05 |
| (in accordance | 1.22 | 1.18 | 1.75 | C/O = 1.46 ± 0.04 |
| with DE 101 | | | | |
| 31 156 A1) | | | | |
| (Comparison) | | | | |

The inventive plasma polymer product, which underwent the ESCA measurement, compared with a typical easy-to-clean coating in accordance with DE 101 31 156 A1, has an approximately 0.37 to 0.53 eV bond energy position shifted to lower energy of the Si 2p peak. These observations point to an increase in the proportion of secondary silicon atoms (that is, the proportion of silicon atoms with precisely two contiguous O-atoms) compared with the easy-to-clean coating.

The increase in the proportion of secondary silicon atoms is probably a reason for the increased elasticity and flexibility of the inventive coatings compared with the easy-to-clean-coating in accordance with DE 101 31 156 A1, in which the tertiary silicon atoms are far more dominant.

The comparison of the ESCA spectra of the inventive and the easy-to-clean coatings shows that the mechanical characteristics of elasticity and flexibility are directly linked to the respective plasma polymer.

The inventive coating is more carbon-rich and oxygen-poor than the easy-to-clean coating. As a result there are inevitably less cross-linking points. The composition is approximately that of a silicone oil, but compared with the latter, and conventional silicone elastomers, is more strongly cross-linked (more oxygen, less carbon). As a result an elastomer plasma polymer structure can be assumed (with a high hydrogen content).

The invention claimed is:

1. A plasma polymer product, consisting essentially of carbon, silicon, oxygen and hydrogen, whereby in the ESCA spectrum of the plasma polymer product, with calibration to the aliphatic portion of the C 1s peak at 285.00 eV, in comparison with a trimethylsiloxy-terminated polydimethylsiloxane (PDMS) with a kinematic viscosity of 350 mm$^2$/s at 25° C. and a density of 0.97 g/ml at 25° C., the Si 2p peak has a bond energy that is shifted by 0.40 eV at most to higher or lower bond energies, and the O 1s peak has a bond energy that is shifted by 0.50 eV at most to higher or lower bond energies, wherein the following substance quantity molar ratio applies:
    $0.75 < n(O):n(Si) < 1.23$.

2. Plasma polymer product in accordance with claim 1, wherein the O 1s peak has a bond energy that is shifted by 0.40 eV at most to higher or lower bond energies.

3. Plasma polymer product in accordance with claim 1, whereby for the substance quantity ratios in the plasma polymer product the following applies:
    $0.75 < n(O):n(Si) < 1.16$
    $1.50 < n(C):n(Si) < 2.50$
    $1.50 < n(C):n(O) < 2.50$
    $2.25 < n(H):n(C) < 3.00$.

4. Plasma polymer product in accordance with claim 3, whereby for the substance quantity ratios in the plasma polymer product the following applies:
    $1.00 < n(O):n(Si) < 1.16$
    $2.00 < n(C):n(Si) < 2.50$
    $1.60 < n(C):n(O) < 2.30$
    $2.40 < n(H):n(C) < 3.00$.

5. Plasma polymer product in accordance with claim 4, whereby for the substance quantity ratios in the plasma polymer product the following applies:
    $1.05 < n(O):n(Si) < 1.16$
    $2.10 < n(C):n(Si) < 2.23$
    $1.70 < n(C):n(O) < 2.00$
    $2.60 < n(H):n(C) < 3.00$.

6. Plasma polymer product according to claim 1, wherein the plasma polymer product is designed for use as one or more of the following in the group consisting of:
    a migration block against molecules with a molar mass of 100 g/mol or more;
    an outer layer on a barrier coating or a substrate that reduces the migration of gases or vapours;
    a sealing material for seals with a maximum thickness of 1,000 nm;
    a flexible coating of a flexible packaging material;
    a coating to coat optical elements;
    a coating that is stable during hydrolysis;
    a hydrophobic coating;
    an easy-to-clean coating;
    a coating of an elastomer product to increase sliding ability;
    a protective, UV-transparent foil that is stable during hydrolysis;
    a separating layer or part of a separating layer
    a repair foil for easy-to-clean or separating layer applications or optical applications;
    a foil or coating with dehesive and adhesive surface characteristics;
    a foil with a holed and/or striated pattern;
    a soft spacer layer between hard layers or substrates that need to be separated;
    a hydrophobic covering layer for preventing the adsorption of polar molecules or to improve the barrier characteristics of barrier coating or ultra-barrier coatings against gases or vapours;
    a separating layer or hydrophobic layer on diamond-like coatings; and
    an insulator foil or coating in electrical components.

* * * * *

UNITED STATES PATENT AND TRADEMARK OFFICE
CERTIFICATE OF CORRECTION

PATENT NO. : 8,455,104 B2
APPLICATION NO. : 12/297750
DATED : June 4, 2013
INVENTOR(S) : Klaus-Dieter Vissing et al.

It is certified that error appears in the above-identified patent and that said Letters Patent is hereby corrected as shown below:

Title page (57) Abstract, line 7, "25° C." should read --25° C--;

Title page (57) Abstract, line 8, "25° C.," should read --25° C,--;

In the Claims

Column 19, claim 1, line 33, "25° C." should read --25° C--;

Column 19, claim 1, line 33, "of0.97" should read --of 0.97--;

Column 19, claim 1, line 33, "25° C.," should read --25° C,--;

Column 20, claim 6, after line 27, please insert the following:

--a corrosion protection coating;--.

Signed and Sealed this
Eleventh Day of March, 2014

Michelle K. Lee
*Deputy Director of the United States Patent and Trademark Office*